US012747413B2

(12) United States Patent
Benson

(10) Patent No.: US 12,747,413 B2
(45) Date of Patent: Sep. 29, 2026

(54) DETERGENT COMPOSITIONS FOR MACHINE DISHWASHING COMPRISING ETHOXYLATED GLYCEROL ESTERS AND MODIFIED FATTY ALCOHOL ALKOXYLATES

(71) Applicant: CLARIANT INTERNATIONAL LTD, Muttenz (CH)

(72) Inventor: Hannah Benson, Heppenheim (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 231 days.

(21) Appl. No.: 18/698,059

(22) PCT Filed: Sep. 30, 2022

(86) PCT No.: PCT/EP2022/077298

§ 371 (c)(1),
(2) Date: Apr. 3, 2024

(87) PCT Pub. No.: WO2023/057335

PCT Pub. Date: Apr. 13, 2023

(65) Prior Publication Data

US 2024/0400939 A1 Dec. 5, 2024

(30) Foreign Application Priority Data

Oct. 7, 2021 (EP) .................................... 21201542

(51) Int. Cl.

*C11D 1/00* (2006.01)
*C11D 1/825* (2006.01)
*C11D 1/72* (2006.01)
*C11D 1/74* (2006.01)

(52) U.S. Cl.

CPC .............. *C11D 1/825* (2013.01); *C11D 1/721* (2013.01); *C11D 1/74* (2013.01)

(58) Field of Classification Search

CPC ........... C11D 1/825; C11D 1/721; C11D 1/74; C11D 1/667; C11D 1/72; C11D 1/722

See application file for complete search history.

(56) References Cited

U.S. PATENT DOCUMENTS 3,972,888 A 8/1976 Lohaus
4,904,359 A * 2/1990 Pancheri .............. C11D 3/3703 510/423
5,854,193 A * 12/1998 Mondin ................... C11D 3/43 510/508
6,239,091 B1 5/2001 Tartakovsky
6,369,019 B1 * 4/2002 Gordon ................ C11D 3/2093 510/421
7,871,971 B1 * 1/2011 Koester .................. C11D 1/835 510/421
2010/0160204 A1 6/2010 Zipfel
2022/0159375 A1 * 5/2022 Jarvis ....................... G06F 3/165
2022/0213412 A1 * 7/2022 Benson .................. C11D 3/044

FOREIGN PATENT DOCUMENTS

DE 10032612 A1 2/2002
EP 0077588 A1 4/1983
EP 0158481 A2 10/1985
EP 0255689 A2 2/1988
EP 0550637 7/1993
EP 0710650 A2 5/1996
EP 1045021 A1 10/2000
EP 0730636 B1 * 4/2001 ............... C11D 1/12
EP 1757676 A1 2/2007
EP 2666848 A1 11/2013
EP 3744821 A1 * 12/2020 ........... C11D 3/2068
GB 1416397 A 12/1975
JP 6401794 10/2018
WO 9523204 A1 8/1995
WO 9718284 A2 5/1997
WO 2005075621 A1 8/2005
WO 2005097963 A1 10/2005
WO 2007073801 A1 7/2007
WO 2008064345 A2 5/2008
WO 2008095563 A1 8/2008
WO 2012042001 A1 4/2012
WO 2013178700 A2 12/2013
WO 2014138327 A1 9/2014
WO 2016030226 A1 3/2016
WO 2017005793 A1 1/2017
WO 2017058934 A1 4/2017
WO 2020239750 A1 12/2020
WO 2020239760 A1 12/2020
WO 2021078807 A1 4/2021
WO 2021089887 A1 5/2021

OTHER PUBLICATIONS

STIC Search Report dated Feb. 26, 2026.*
DIN EN ISO 3681_Mar. 2019_Verseifungszahl, Mar. 2019, 13 pages.
DIN EN ISO 4629-2, Dec. 2016, 14 pages.
Extended European Search Report issued in App. No. EP21186503, dated Oct. 21, 2021, 8 pages.

* cited by examiner

*Primary Examiner* — Eisa B Elhilo

(57) ABSTRACT

A detergent composition for machine dishwashing is described, wherein the detergent composition comprises components Z1) and Z2):

Z1) a component comprising one or more specific ethoxylated glycerol esters and

Z2) one or more specific modified fatty alcohol alkoxylates.

15 Claims, No Drawings

DETERGENT COMPOSITIONS FOR MACHINE DISHWASHING COMPRISING ETHOXYLATED GLYCEROL ESTERS AND MODIFIED FATTY ALCOHOL ALKOXYLATES

The present invention relates to a detergent composition for machine dishwashing comprising components Z1) and Z2):

Z1) a component comprising one or more specific ethoxylated glycerol esters and

Z2) one or more specific modified fatty alcohol alkoxylates, to a method of cleaning dishes in a dishwashing machine using the detergent composition according to the invention, to the use of the detergent composition according to the invention or of a mixture of components Z1) and Z2) as a rinse aid during machinated dishwashing, or for improving the wettability of dishes during machinated dishwashing, or for the reduction and/or avoidance of stain and film formation, in particular fatty residue formation, on dishes, in the machine compartment and/or on the filter of the machine during machinated dishwashing, or for the reduction and/or avoidance of malodor in the dishwasher, and to the use of a mixture of components Z1) and Z2) for improving the rinse aiding properties and/or the drying capacity of a machine dishwashing detergent composition, preferably a detergent composition according to the invention.

The requirements concerning machine-washed dishes are nowadays very high, especially when compared to manually washed dishes. Apart from residue-free cleaning, the complete washing program, typically comprising a pre-rinsing step, a main washing step, a final rinsing step and a drying step, each step often being interrupted by intermediate rinsing steps, should result in flawlessly glossy dishes free of stripes and stains. Even after proper removal of food remains from the dishes, white stains and residues derived from water hardness and other inorganic or organic salts stemming from water droplets and water films may lead to unsatisfactory dishwashing results. Therefore, rinse aids are employed in machinated dishwashing in order to improve the dishwashing performance in terms of obtaining stripe-free, stain-free and residue-free dishes. Rinse aids are typically automatically introduced from a rinse aid dispenser into the dish compartment of the dishwasher during the final rinse step. Alternatively, multi-functional detergent products often already include a rinse aid component.

Typical rinse aids are liquid mixtures of weakly foaming nonionic surfactants, organic acids such as citric acid, film-inhibiting polymers, solvents such as alcohols, and other additives such as hydrotropic agents, thickeners and/or foam inhibitors. Rinse aid formulations are usually liquid at 20° C. and have an acidic pH value of 6 or less. They are often added into the dish compartment of the dishwashing machine during the final rinsing step.

The object of rinse aids is to affect the interface and surface tension of water in such a way that it can run off the rinsed surfaces as a thin film, thus that during the subsequent drying step no water droplets, limestone scales, stripes, films or other residues remain on the washed dishes.

Dishwashing in dishwashing machines, especially for domestic applications, is subject to continuous technical changes and improvements. For example, new kinds of combined products ("all in one" formulations) are developed, such as single-phase or multiphase tablets, pouches, pods and caps, or liquid formulations such as multifunctional gels. Such combined products require new rinse aid additives that are effective against stain and film formation and show beneficial rinse aid and/or drying performance, while they are present during the entire washing process.

Often, polymers are used in such detergent compositions, and are useful as water softeners and/or rinse aid additives. Different nonionic, anionic, cationic or amphoteric polymers are described in the art.

DE 10032612 A1 describes the use of specific copolymers from carboxylic acids, sulfonic acid-containing monomers and optionally additional ionic or nonionic monomers for improving the rinse aid and drying performance of detergents in machinated dishwashing.

WO 2007/073801, WO 2005/097963 and WO 2005/075621 disclose detergent compositions comprising positively charged polymers and specific additional components such as surfactants, chelating agents, whiteners as rinse aids in machinated dishwashing.

WO 2012/042001 describes detergent compositions comprising cationic polysaccharides and their use in machinated dishwashing for removing, reducing or preventing stains and/or films on glass.

U.S. Pat. No. 6,239,091 discloses detergent compositions comprising water-soluble cationic or amphoteric polymers and their use in machinated dishwashing for removing, reducing or preventing stains and/or films on glass.

EP-A 0077588 describes detergent compositions or rinse aids comprising nonionic surfactants and cationic polyelectrolytes.

EP-A 1045021 discloses a composition comprising a mixture of alkoxylated mono-, di- and triglycerides and glycerol and detergent compositions therefrom.

JP 64001794 A discloses enzyme- and polyoxyalkylene-containing liquid detergents for dishwashers.

WO 2020/239760 describes the use of ethoxylated glycerol ester-containing detergents for machine dishwashing.

WO 2020/239750 describes ethoxylated glycerol ester and a method for the production thereof.

Mixed hydroxy ethers ("HME") are particularly efficient non-ionic surfactants for rinsing, see e.g., WO 2008/095563 and WO 2021/089887. However, their overall performance can still be improved. Especially the use of mixed hydroxy ethers in formulations disclosed in WO 2008/095563 in automatic dishwashers can lead to rather high amounts of surfactant and fat residues in the filters or sieves.

In WO 2017/005793 a process for cleaning dishware is described, in which mixed hydroxy ethers are used in combination with polyalkoxylated polyalkylenimines to avoid significant residues of surfactant and fat in the filters or sieves of the dishwashing machine.

Although the number of effective detergent formulations known in the art is large and growing, the performance of the formulations still needs to be improved, especially in terms of rinse aid performance and drying performance of detergents for machinated dishwashing in combination with cleanliness in the machine.

One object of the present invention is to provide a detergent for machinated dishwashing, which shows a beneficial performance, especially in terms of beneficial rinse aid performance and drying performance in combination with cleanliness in the machine and on items.

Surprisingly, it was found that this objective is solved by a detergent composition for machine dishwashing comprising components Z1) and Z2):

Z1) a component comprising one or more ethoxylated glycerol esters of the formula (I)

(I)

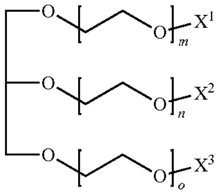

wherein $X^1$ is —C(═O)—$R^1$ or H, $X^2$ is —C(═O)—$R^2$ or H, $X^3$ is —C(═O)—$R^3$ or H with the proviso that not all of the groups $X^1$, $X^2$ and $X^3$ are H;

$R^1$, $R^2$ and $R^3$ are equal or different and are independently selected from saturated or unsaturated, linear or branched $C_7$-$C_{24}$ aliphatic groups; and m, n and o are equal or different and are each independently an integer number from 1 to 200, preferably from 1 to 80, more preferably from 2 to 70, with the proviso that the number-average of the sum of m+n+o is greater than 2, preferably greater than 5, more preferably from 20 to 70, even more preferably from 30 to 60;

and

Z2) one or more modified fatty alcohol alkoxylates of the formula (XI)

$$R_aO—(AO)_x—Y, \qquad (XI)$$

in which $R_a$ is a linear or branched saturated alkyl group having 8 to 30 carbon atoms, or a linear or branched unsaturated alkenyl group having one or more double bonds and 8 to 30 carbon atoms, A is selected from the group consisting of —$C_2H_4$— and —$C_3H_6$—, x is a number from 1 to 150, Y is a group —$CH_2$—CH(OH)—$R_b$ or is a linear or branched saturated alkyl group having 1 to 30 carbon atoms, preferably —$CH_2$—CH(OH)—$R_b$, $R_b$ is a linear or branched saturated alkyl group having 1 to 30 carbon atoms, and where the group -$(AO)_x$— comprises one or more —$C_2H_4$—O— groups and may additionally comprise one or more —$C_3H_6$—O— groups, and, when the group -$(AO)_x$— simultaneously comprises —$C_2H_4$—O— and —$C_3H_6$—O— groups, the —$C_2H_4$—O— and —$C_3H_6$—O— groups may be distributed over the -$(AO)_x$— group in any desired way, preferably in random, gradient-like or block-like manner and more preferably in block-like manner, and the molar amount of the —$C_2H_4$—O— groups in the group -$(AO)_x$— is preferably greater than the molar amount of the —$C_3H_6$—O— groups in the group -$(AO)_x$—.

Therefore, a subject matter of the invention is a detergent composition for machine dishwashing comprising components Z1) and Z2):

Z1) a component comprising one or more ethoxylated glycerol esters of the formula (I)

(I)

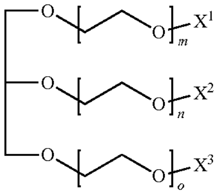

wherein $X^1$ is —C(═O)—$R^1$ or H, $X^2$ is —C(═O)—$R^2$ or H, $X^3$ is —C(═O)—$R^3$ or H with the proviso that not all of the groups $X^1$, $X^2$ and $X^3$ are H;

$R^1$, $R^2$ and $R^3$ are equal or different and are independently selected from saturated or unsaturated, linear or branched $C_7$-$C_{24}$ aliphatic groups; and m, n and o are equal or different and are each independently an integer number from 1 to 200, preferably from 1 to 80, more preferably from 2 to 70, with the proviso that the number-average of the sum of m+n+o is greater than 2, preferably greater than 5, more preferably from 20 to 70, even more preferably from 30 to 60;

and

Z2) one or more modified fatty alcohol alkoxylates of the formula (XI)

$$R_aO—(AO)_x—Y, \qquad (XI)$$

in which $R_a$ is a linear or branched saturated alkyl group having 8 to 30 carbon atoms, or a linear or branched unsaturated alkenyl group having one or more double bonds and 8 to 30 carbon atoms, A is selected from the group consisting of —$C_2H_4$— and —$C_3H_6$—, x is a number from 1 to 150, Y is a group —$CH_2$—CH(OH)—$R_b$ or is a linear or branched saturated alkyl group having 1 to 30 carbon atoms, preferably —$CH_2$—CH(OH)—$R_b$, $R_b$ is a linear or branched saturated alkyl group having 1 to 30 carbon atoms, and where the group -$(AO)_x$— comprises one or more —$C_2H_4$—O— groups and may additionally comprise one or more —$C_3H_6$—O— groups, and, when the group -$(AO)_x$— simultaneously comprises —$C_2H_4$—O— and —$C_3H_6$—O— groups, the —$C_2H_4$—O— and —$C_3H_6$—O— groups may be distributed over the -$(AO)_x$— group in any desired way, preferably in random, gradient-like or block-like manner and more preferably in block-like manner, and the molar amount of the —$C_2H_4$—O— groups in the group -$(AO)_x$— is preferably greater than the molar amount of the —$C_3H_6$—O— groups in the group -$(AO)_x$—.

The detergent composition according to the invention and the mixture of component Z1) and component Z2) as defined for the detergent composition according to the invention may advantageously be used in machinated dishwashing, in particular for the cleaning of dishes in a dishwashing machine.

An advantage of the invention is that the detergent composition according to the invention and the mixture of component Z1) and component Z2) as defined for the detergent composition according to the invention show very good results as rinse aids during machinated dishwashing, especially in terms of improving wettability of dishes and/or the reduction and/or avoidance of stain and film formation, in particular fatty residue formation, on dishes, in the machine compartment and/or on the filter of the machine during machinated dishwashing.

The mixture of component Z1) and component Z2) as defined for the detergent composition according to the invention may be used both in conventional rinse aids and in conventional combined products, as well as any other forms of detergent formulations known in the art. The mixture of component Z1) and component Z2) as defined for the detergent composition according to the invention shows the beneficial effects independently of the form or preparation method of the detergent composition for machine dishwashing.

A further advantage of the invention is that the detergent composition according to the invention and the mixture of component Z1) and component Z2) as defined for the detergent composition according to the invention may advantageously be used for the reduction and/or avoidance of malodor in a dishwasher.

Another benefit of the invention is that the detergent composition according to the invention leads to an improved drying capacity of the dishes treated with the detergent composition according to the invention.

Furthermore, the mixture of component Z1) and component Z2) as defined for the detergent composition according to the invention may advantageously be used for improving the rinse aiding properties and/or the drying capacity of a machine dishwashing detergent composition, preferably a detergent composition according to the invention.

Furthermore, the mixture of component Z1) and component Z2) as defined for the detergent compositions according to the invention do not increase the foaming rate of detergent compositions, thus that the detergent composition according to the invention is weakly foaming.

Moreover, the detergent composition according to the invention retains the beneficial rinse aiding properties even in phosphate-free compositions.

In a preferred embodiment, component Z1) of the detergent composition according to the invention further comprises, in addition to the one or more ethoxylated glycerol esters of the formula (I), one or more polyethyleneglycol diesters of the formula (XV)

(XV)

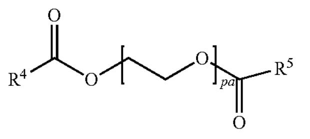

wherein $R^4$ and $R^5$ are equal or different and are independently selected from saturated or unsaturated, linear or branched $C_7$-$C_{24}$ aliphatic groups; and pa is an integer number from 1 to 200, preferably from 1 to 80, more preferably from 5 to 30 and even more preferably from 10 to 20.

Component Z1) of the detergent composition according to the invention may comprise, in addition to the one or more ethoxylated glycerol esters of the formula (I) and optionally the one or more polyethyleneglycol diesters of the formula (XV), one or more further substances selected from the group consisting of polyethyleneglycol monoesters of the formula (XIX)

$$R^6—COO—[Ch_2CH_2O]_{pw}—H, \quad (XIX)$$

wherein $R^6$ is selected from saturated or unsaturated, linear or branched $C_7$-$C_{24}$ aliphatic groups; and pw is an integer number from 1 to 200, preferably from 1 to 80, more preferably from 5 to 30 and even more preferably from 10 to 20; and polyethyleneglycols of the formula (XX)

$$HO—[Ch_2CH_2O]_{px}—H, \quad (XX)$$

wherein px is an integer number from 1 to 200, preferably from 1 to 80, more preferably from 5 to 80 and even more preferably from 10 to 80.

Component Z1) of the detergent composition according to the invention preferably is a product mixture, more preferably a product mixture from the preparation of one or more ethoxylated glycerol esters of the formula (I) and even more preferably a product mixture from the preparation of one or more ethoxylated glycerol esters of the formula (I) by ethoxylating one or more triglycerides and preferably one or more triglycerides of the formula (II), in particular in the presence of a calcium-based catalyst as described below.

In a preferred embodiment of the invention, component Z1) of the detergent composition according to the invention is prepared from 1 to 200 mol ethylene oxide, preferably from 1 to 80 mol ethylene oxide, more preferably from 20 to 70 mol ethylene oxide and even more preferably from 30 to 60 mol ethylene oxide; and 1 mol of one or more triglycerides of the formula (II)

(II)

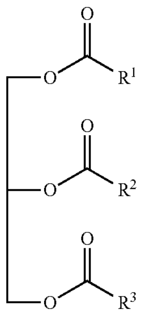

in the presence of a calcium-based catalyst, wherein $R^1$, $R^2$ and $R^3$ in formula (II) are equal or different and are independently selected from saturated or unsaturated, linear or branched $C_7$-$C_{24}$ aliphatic groups.

Preferably, component Z1) is prepared with a calcium-based catalyst (C) obtainable by a reaction involving (A) calcium hydroxide and (B) a carboxylic acid comprising 3 to 40 carbon atoms, wherein the molar ratio of calcium hydroxide (A) to carboxylic acid (B) in the preparation of the catalyst (C) is from 1:1 to 1:5. More preferably, the molar ratio (A):(B) is from 1:1.5 to 1:4, even more preferably from 1:1.8 to 1:2.2, and particularly preferably from 1:1.9 to 1:2.1.

The reaction for the preparation of the catalyst (C) involving calcium hydroxide (A) and carboxylic acid (B) is preferably carried out in the presence of at least one polar solvent, more preferably at least one polar solvent comprising at least one hydroxyl group and even more preferably at least one alcohol having 1 to 5 carbon atoms or a mixture thereof with water. In a particularly preferred embodiment, the polar solvent is propan-2-ol or a mixture thereof with water.

Preferably, the reaction for the preparation of the catalyst (C) involves a carboxylic acid (B) represented by formula (III) or formula (IV)

(III)

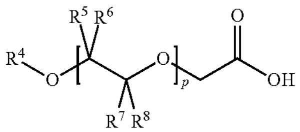

(IV)

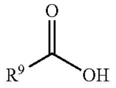

wherein $R^4$ in formula (III) is selected from saturated or unsaturated, linear or branched $C_1$-$C_{30}$ aliphatic groups, preferably $C_5$-$C_{20}$ aliphatic groups, and more preferably $C_8$-$C_{18}$ aliphatic groups;

$R^5$, $R^6$, $R^7$ and $R^8$ in formula (III) are equal or different and are independently selected from the group consisting of hydrogen, methyl and ethyl, and preferably are hydrogen;

p in formula (III) is an integer number from 0 to 20, preferably an integer number from 1 to 20, more preferably an integer number from 1 to 11, and even more preferably an integer number from 2 to 7; and $R^9$ in formula (IV) is selected from saturated or unsaturated, linear or branched $C_5$-$C_{30}$ aliphatic groups, preferably $C_6$-$C_{18}$ aliphatic groups, and more preferably $C_8$-$C_{12}$ aliphatic groups.

In a preferred embodiment, in the carboxylic acid of formula (III)

$R^4$ is a saturated or unsaturated, linear or branched $C_8$-$C_{18}$ aliphatic group, $R^5$, $R^6$, $R^7$ and $R^8$ are hydrogen and p is an integer number from 1 to 11.

In a more preferred embodiment, in the carboxylic acid of formula (III)

$R^4$ is a saturated or unsaturated, linear or branched $C_8$-$C_{18}$ aliphatic group, $R^5$, $R^6$, $R^7$ and $R^8$ are hydrogen and p is an integer number from 2 to 7.

In a further preferred embodiment, the carboxylic acid of formula (IV) is iso-nonanoic acid.

Among the carboxylic acids of the formulae (III) and (IV), the carboxylic acids of the formula (III) are preferred.

Preferably, the reaction for the preparation of the catalyst (C) involving calcium hydroxide (A) and carboxylic acid (B) further involves an acid (AC) having a $pK_A$ value of 3 or less, preferably 2 or less, more preferably 0 or less, and even more preferably-3 or less.

Preferably, the acid (AC) is selected from the group consisting of acids of sulfur oxides and phosphorus oxides, more preferably from the group consisting of sulfuric acid, sulfurous acid, sulfonic acids (such as methane sulfonic acid), phosphorus acid, phosphorous acid and phosphonic acids (such as methane phosphonic acid), and even more preferably from the group consisting of sulfuric acid, sulfurous acid and methane sulfonic acid.

In a particularly preferred embodiment, the acid (AC) is sulfuric acid.

Preferably, the acid (AC) is used in the reaction for the preparation of the catalyst (C) thus that the molar ratio of the calcium hydroxide (A) to the acid (AC) is from 5:1 to 1:1, more preferably from 3:1 to 1:1, and even more preferably from 2:1 to 1:1.

It is particularly advantageous to prepare the calcium catalyst (C) by first allowing the calcium hydroxide (A) to react with the carboxylic acid (B), preferably in a solvent as described above, after which the reaction mixture is further treated with the acid (AC).

For the reaction by which the calcium catalyst (C) is prepared, any common reactor may be employed, preferably a reactor with an agitating/mixing means, such as, e.g., a magnetic stirrer, a mechanical stirrer, a static mixer, a blender or a batch disperser. Particularly preferably, the mixing of the components is carried out using a batch disperser.

The preparation of the catalyst (C) is preferably carried out under a pressure of from 0.5 to 2 bar, more preferably from 0.8 to 1.5 bar, and even more preferably from 0.9 to 1.2 bar. In a preferred embodiment, the catalyst (C) is prepared under atmospheric pressure. Furthermore, the catalyst (C) is preferably prepared at a temperature of from −30° C. to 100° C., more preferably from 0° C. to 80° C., and even more preferably from 30° C. to 60° C.

The thus prepared calcium catalyst (C) has a content of $Ca^{2+}$ ions that is preferably between 0.5 wt.-% and 5 wt.-%, more preferably from 1 to 4 wt.-% and even more preferably from 2 to 3 wt.-%. Optionally, the catalyst may be rid of volatile components, such as the solvent, water and other volatile byproducts by employing commonly used methods. Preferably, the volatile components are removed in vacuo, e.g. under a pressure below 0.8 bar, preferably below 0.3 bar, and more preferably below 0.1 bar, and/or at elevated temperatures, e.g. 50 to 180° C., preferably 70 to 150° C., and more preferably 80 to 120° C.

In a particularly preferred embodiment, the volatile compounds are removed on a rotary evaporator at a pressure below 0.1 bar and a temperature of from 80° C. to 120° C.

Preferably, the volatile components are removed before the catalyst (C) is used for the preparation of the product mixture of component Z1) of the detergent composition according to the invention.

The one or more triglycerides of the formula (II) are not particularly limited and may be natural triglycerides or synthetic triglycerides. For the preparation of the one or more ethoxylated glycerol esters of the formula (I), the one or more triglycerides of the formula (II) may be used in a mixture with by-products occurring in nature together with the triglycerides or generated during their preparation, such as by-products containing free hydroxyl groups, e.g. mono- or diglycerides, or in a purified or enriched form, whereby purification or enrichment can e.g. be achieved by employing column chromatography techniques.

Preferably, the one or more triglycerides of formula (II) are selected from the group of vegetable oils and animal fats known in the art including, but not limited to, abyssinian oil, almond oil, apricot kernel oil, avocado oil, babassu oil, beef tallow, borage oil, canola oil, castor oil, cocoa butter, coconut oil, corn oil, cottonseed oil, crisco shortening, emu oil, grapeseed oil, groundnut oil, hazelnut oil, illipe butter, jojoba oil, kukui nut oil, lard, macadamia nut oil, mango butter, neem oil, olive oil, palm oil, palm kernel oil, peach kernel oil, peanut oil, rapeseed oil, rice bran oil, safflower oil, sesame oil, shea butter, soybean oil, sunflower oil, walnut oil, and wheat germ oil.

More preferably, component Z1) of the detergent composition according to the invention is prepared from triglycerides of the formula (II) selected from the group consisting of coconut oil and rapeseed oil, preferably from coconut oil.

The product mixture from the preparation of ethoxylated glycerol esters of the formula (I) and in particular a product mixture prepared from ethylene oxide and one or more triglycerides of the formula (II) in the presence of a calcium-based catalyst as described above, may comprise, in addition to the one or more ethoxylated glycerol esters of the formula (I), further substances which may be formed in the preparation of the ethoxylated glycerol esters of the formula (I), e.g. substances according to the formula (XV), (XIX) or (XX).

The respective product mixture may be used as component Z1) in the detergent compositions according to the invention as obtained from the preparation of the one or more ethoxylated glycerol esters of the formula (I) or the one or more ethoxylated glycerol esters of the formula (I) may be purified or enriched after their preparation and before they are used as component Z1) in the detergent compositions according to the invention, e.g. by employing column chromatography techniques or by employing ion exchange and subsequent filtration techniques.

In a preferred embodiment of the invention, the respective product mixture is used as component Z1) in the detergent compositions according to the invention as obtained from the preparation of the one or more ethoxylated glycerol esters of the formula (I), in particular when the one or more ethoxylated glycerol esters of the formula (I) have been prepared from ethylene oxide and one or more triglycerides of the formula (II) in the presence of a calcium-based catalyst as described above.

Preferably, the one or more ethoxylated glycerol esters of the formula (I) are present in component Z1) in an amount of 60 wt.-% or more, more preferably 70 wt.-% or more, even more preferably 75 wt.-% or more and particularly preferably 80 wt.-% or more, in each case based on the total weight of component Z1) of the detergent composition according to the invention.

More preferably, the one or more ethoxylated glycerol esters of the formula (I) are present in component Z1) in an amount of 60 to 100 wt.-%, more preferably 60 to 99.99 wt.-%, even more preferably 70 to 99.9 wt.-%, particularly preferably 75 to 98 wt.-% and extraordinarily preferably 80 to 95 wt.-%, in each case based on the total weight of component Z1) of the detergent composition according to the invention.

The one or more polyethyleneglycol diesters of the formula (XV) are present in component Z1) of the detergent composition according to the invention in an amount of preferably 0 to 25 wt.-%, more preferably 0 to 20 wt.-%, even more preferably 0 to 10 wt.-% and particularly preferably 0 to 5 wt.-%, in each case based on the total weight of component Z1) of the detergent composition according to the invention. This means that component Z1) does not necessarily have to comprise any polyethyleneglycol diesters of the formula (XV). However, the amount of the one or more polyethyleneglycol diesters of the formula (XV) in component Z1) of the detergent composition according to the invention, if it is not 0%, is preferably from 0.01 to 25 wt.-%, more preferably from 0.1 to 20 wt.-%, even more preferably from 0.5 to 10 wt.-% and particularly preferably from 1 to 5 wt.-%, in each case based on the total weight of component Z1) of the detergent composition according to the invention.

The total amount of the substances selected from the group consisting of the one or more substances of the formula (XIX) and the one or more substances of the formula (XX) in component Z1) of the detergent composition according to the invention, if it is not 0%, is preferably from 0.01 to 10 wt.-%, more preferably from 0.1 to 5 wt.-% and even more preferably from 0.1 to 2 wt.-%, in each case based on the total weight of component Z1) of the detergent composition according to the invention.

The predominant species in component Z1) of the detergent composition according to the invention is preferably one or more ethoxylated glycerol esters of the formula (I), in which $X^1$ is —C(═O)—$R^1$, $X^2$ is —C(═O)—$R^2$ and $X^3$ is —C(═O)—$R^3$.

The amount of the one or more ethoxylated glycerol esters of the formula (I), in which $X^1$ is —C(═O)—$R^1$, $X^2$ is —C(═O)—$R^2$ and $X^3$ is —C(═O)—$R^3$, in component Z1) of the detergent compositions according to the invention preferably is from 70 to 98 wt.-%, more preferably from 75 to 95 wt.-% and even more preferably from 85 to 95 wt.-%, based on the total weight of the ethoxylated glycerol esters of the formula (I) contained in component Z1) of the detergent compositions according to the invention.

The hydroxyl value of component Z1) of the detergent composition according to the invention, prepared in the presence of the above defined catalyst (C), measured according to DIN EN ISO 4629-2, is preferably less than 10 mg KOH/g above the hydroxyl value of the one or more triglycerides of the formula (II).

Preferably, the hydroxyl value of component Z1) of the detergent composition according to the invention is smaller than 10 mg KOH/g. Furthermore, the ratio of $CH_2OH$ groups to alkyl —$CH_3$ groups in component Z1) of the detergent composition according to the invention is typically below 0.15, preferably below 0.12, more preferably below 0.08, even more preferably below 0.06, measured as the ratio of the integrals of corresponding signals in proton-NMR spectra.

Preferably, the saponification value of component Z1) of the detergent composition according to the invention is below 220 mg KOH/g and more preferably below 150 mg KOH/g. Preferably, the saponification value of component Z1) of the detergent composition according to the invention is above 60 mg KOH/g. The saponification values are measured according to DIN EN ISO 3681.

Examples for the alkyl- and alkenyl-groups $R_a$ of formula (XI) of component Z2) are, e.g. the alkyl and alkenyl groups of the following alcohols $R_a$—OH: 1-octanol (caprylic alcohol), 2-ethylhexanol, 1-nonanol (pelargonic alcohol), 1-decanol (capric alcohol), 1-undecanol, 1-dodecanol (lauryl alcohol), 1-tridecanol, isotridecanol, 1-tetradecanol (myristyl alcohol), 1-pentadecanol, 1-hexadecanol (cetyl alcohol), cis-9-hexadecene-1-ol (palmitoleyl alcohol), 1-heptadecanol, 1-octadecanol (stearyl alcohol), cetearyl alcohol, 16-methylheptadecan-1-ol (isostearyl alcohol), 9E-octadecene-1-ol (elaidyl alcohol), cis-9-octadecene-1-ol (oleyl alcohol), oleyl cetyl alcohol (i.e., a mixture of oleyl alcohol and cetyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E, 12E, 15E-octadecatriene-1-ol (elaidolinolenyl alcohol), 1-nonadecanol, 1-eicosanol (arachidyl alcohol), 1-heneicosanol, 1-docosanol (behenyl alcohol), cis-13-docosen-1-ol (erucyl alcohol), 1-tetracosanol (lignoceryl alcohol), 1-hexacosanol (ceryl alcohol), 1-octacosanol (montanyl alcohol) and 1-triacontanol (myricyl alcohol) or mixtures thereof.

$R_a$ in formula (XI) preferably represents a linear or branched saturated alkyl group having 8 to 30 carbon atoms or a linear or branched unsaturated alkenyl group having one or more double bonds and 8 to 30 carbon atoms, more preferably a linear or branched saturated alkyl group having 8 to 20 carbon atoms or a linear or branched unsaturated alkenyl group having one or more double bonds and 8 to 20 carbon atoms, and particularly preferably a linear or branched saturated alkyl group having 8 to 15 carbon atoms or a linear or branched unsaturated alkenyl group having one or more double bonds and 8 to 15 carbon atoms.

Preferably, the groups $R_a$ in formula (XI) are alkyl groups.

Preferably, x in formula (XI) is a number from 1 to 150, more preferably from 5 to 100, even more preferably 5 to 50, and particularly preferably from 15 to 25.

As an example of the alkyl groups Y and $R_b$ of the compounds of the formula (XI), the examples given above for the alkyl group $R_a$ of the compound of formula (XI) may be mentioned. Further examples are the alkyl groups methyl, ethyl, n-propyl, isopropyl, n-butyl, sec-butyl, isobutyl, tert-butyl, n-pentyl, sec-pentyl(2-pentyl), 3-pentyl, 2-methylbutyl, iso-pentyl (3-methylbutyl), 3-methylbut-2-yl, 2-methylbut-2-yl, neo-pentyl (2,2-dimethylpropyl), 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2,3-dimethyl-2-butyl, 3,3-dimethyl-2-butyl, 2-ethyl-1-butyl, 1-heptyl, 2-heptyl, 3-heptyl and 4-heptyl.

When Y in the formula (XI) represents a linear or branched alkyl group, it is preferably an alkyl group having 1 to 22 carbon atoms.

$R_b$ in formula (XI) preferably represents a linear or branched alkyl group having 8 to 22 carbon atoms.

In a preferred embodiment of the invention, the group $-(-AO-)_x-$ consists of one or more $-C_2H_4O$ groups and contains no $-C_3H_6O$ groups.

In a further preferred embodiment of the invention, the group $-(-AO-)_x-$ contains one or more $-C_2H_4O$ groups and one or more $-C_3H_6O$ groups. In this preferred embodiment of the invention, the molar amount of the $-C_3H_6O$ groups, based on the total amount of $-C_2H_4O$ and $C_3H_6O$ groups, is preferably less than 50%, more preferably 45% or less than 45%, even more preferably 40% or less than 40% and particularly preferably 33% or less than 33%.

In a further preferred embodiment of the invention Y in formula (XI) represents an alkyl group having 1 to 4 carbon atoms. In this preferred embodiment, the molar amount of the $-C_3H_6O$ groups, based on the total amount of $-C_2H_4O$ and $-C_3H_6O$ groups, is preferably 20% or less than 20% and particularly preferably 10% or less than 10%.

In a further embodiment of the invention, Y in formula (XI) represents the group $-CH_2-CH(OH)-R_b$, in which $R_b$ is a linear or branched alkyl group having 8 to 22 carbon atoms. In this preferred embodiment, the molar amount of the $-C_3H_6O$ groups, based on the total amount of $-C_2H_4O$ and $-C_3H_6O$ groups, is preferably 20% or less than 20% and particularly preferably 10% or less than 10%.

The variable "x" in the one or more compounds of formula (XI) represents molar averages, i.e. the detergent composition according to the invention may contain several compounds of formula (XI) with different degrees of alkoxylation.

In a preferred embodiment, in the one or more modified fatty alcohol alkoxylates of the formula (XI)

$$R_aO-(AO)_x-Y \quad (XI)$$

of component Z2), $R_a$ is a linear or branched saturated alkyl group having 8 to 20 carbon atoms, preferably 8 to 15 carbon atoms or a linear or branched unsaturated alkenyl group having one or more double bonds and 8 to 20 carbon atoms, preferably 8 to 15 carbon atoms, A is $-C_2H_4-$, x is a number from 5 to 100, preferably from 15 to 25, and Y is a group $-CH_2-CH(OH)-R_b$, and $R_b$ is a linear or branched alkyl group having 8 to 22 carbon atoms.

In a more preferred embodiment, in the one or more modified fatty alcohol alkoxylates of the formula (XI)

$$R_aO-(AO)_x-Y \quad (XI)$$

of component Z2), $R_a$ is a linear or branched saturated alkyl group having 9 to 13 carbon atoms, preferably 11 carbon atoms or a linear or branched unsaturated alkenyl group having one or more double bonds and 9 to 13 carbon atoms, preferably 11 carbon atoms, A is $-C_2H_4-$, x is a number from 15 to 25, preferably from 20 to 25, and Y is a group $-CH_2-CH(OH)-R_b$, and $R_b$ is a linear or branched alkyl group having 8 to 12 and preferably 10 carbon atoms.

Preferably, the one or more modified fatty alcohol alkoxylates of the formula (XI) of component Z2) are not present on a magnesium carbonate carrier and more preferably are not present on any carrier. More Preferably, the detergent compositions according to the invention do not comprise any surfactant on a magnesium carbonate carrier and more preferably do not comprise any surfactant on any carrier.

Preferably, the detergent composition according to the invention comprises from 0.1 to 15 wt.-%, preferably from 0.5 to 5.0 wt.-% and more preferably from 0.5 to 3.0 wt.-% of component Z1) and from 0.1 to 15 wt.-%, preferably from 0.5 to 6.0 wt.-% and more preferably from 1.0 to 5.0 wt.-% of component Z2), in each case based on the total weight of the detergent composition.

The detergent composition according to the invention preferably comprises component Z1) and component Z2) in a Z1):Z2) weight-ratio of from 1:1 to 1:3, more preferably of from 1:1.5 to 1:2.5 and even more preferably of 1:2.

The pH value of the detergent composition according to the invention is preferably from 8 to 13, more preferably from 9 to 12, even more preferably from 9.5 to 11.5 measured at 20° C., as a 10 wt.-% aqueous solution of the detergent composition according to the invention.

Preferably, the detergent composition according to the invention comprises, further to the components Z1) and Z2), one or more components selected from:

Z3) one or more enzymes;

Z4) one or more builders;

Z5) one or more bleaching agents;

Z6) one or more surfactants different from components Z1) and Z2);

Z7) one or more polymers; and

Z8) one or more further additives, preferably selected from the group consisting of chelating agents, glass corrosion inhibitors, water, organic solvents, thickeners, foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators.

Preferably, the one or more enzymes of component Z3), if present, are selected from the group consisting of proteases, amylases, lipases, hemicellulases, cellulases, perhydrolases and oxidoreductases.

The enzymes are typically of natural origin. Improved variants that are based on natural molecules are obtainable for the use in detergent compositions for machine dishwashing and are accordingly preferred.

Among the proteases, those of the subtilisin type are preferred. Examples are the subtilisins BPN' and Carlsberg, as well as their advanced forms, protease PB92, subtilisins 147 and 309, alkaline protease from *Bacillus lentus*, subtilisin DY and subtilases.

Examples for amylases applicable according to the invention are a-amylases from *Bacillus licheniformis*, from *B. amyloliquefaciens*, from *B. stearothermophilus*, from *Aspergillus niger* and *A. oryzae* as well as their derivatives improved for use in detergent compositions for machine dishwashing. Furthermore, a-Amylase from *Bacillus* sp. A 7-7 (DSM 12368) and the cyclodextrin-glucanotransferase (CGTase) from *B. agaradherens* (DSM 9948) are preferred.

Furthermore, lipases or cutinases may be used in the detergent composition of the invention, in particular due to their triglyceride-cleaving activities, but also for in situ preparing peroxy acids from appropriate precursors. Exemplary lipases are those originating from *Humicola lanuginosa* (*Thermomyces lanuginosus*) or their advanced forms, especially those with the amino acid exchange D96L. Exemplary cutinases are those originally isolable from *Fusarium solani pisi* and *Humicola insolens*.

Moreover, enzymes can be used that are pooled under the term hemicellulases. These are, for example, mannanases, xanthanlyases, pektinlyases (=pektinases), pektinesterases, pektatlyases, xyloglucanases (=xylanases), pullulanases and β-glucanases.

The detergent composition of the invention may also comprise oxidoreductases, for example oxidases, oxygenases, katalases, peroxidases, such as halo-, chloro-, bromo-, lignin-, glucose oder mangan-peroxidases, dioxygenases or laccases (phenoloxidases, polyphenoloxidases). Advantageously, additional, preferably organic, more preferably aromatic compounds that interact with the enzymes, are added in order to increase the activity of the corresponding oxidoreductases (enhancers) or in order to facilitate the electron transport between the oxidizing enzymes and the contaminations if their redox potentials have a large difference (mediators).

The enzymes may be used in any form known in the art, for example as granulated, extruded or lyophilized solid preparations or, particularly in liquid or gel formulations, as solutions of the enzymes, preferably highly concentrated, with a low water content and/or mixed with stabilizers.

Alternatively, the enzymes may be in an encapsulated form, both in solid and in liquid compositions. For example, an enzyme solution may be spray-dried or extruded together with a preferably natural polymer or in the form of capsules, e.g. such, where the enzymes are enclosed in a solidified gel or such of the core-shell type, where an enzyme-containing core is coated with a water-, air- and/or chemical-impermeable protective coating. In additional layers further active agents such as stabilizers, emulsifiers, pigments, whiteners or dyes may be included. Such capsules are prepared by known methods, e.g. shaking granulation or rolling granulation or in fluidized bed processes. Advantageously, such granulates are coated with polymeric film-forming agents and therefore low on dust and storage stable.

Furthermore, it is possible to compound two or more enzymes to prepare granules with multiple enzymatic activities.

The detergent composition according to the invention comprises the one or more enzymes Z3) preferably in amounts of from $1\times10^{-6}$ to 5 wt.-%, more preferably from $1\times10^{-5}$ to 3 wt.-%, even more preferably from $1\times10^{-4}$ to 2 wt.-%, based on the total weight of the detergent composition.

This amount relates to active protein. The protein concentration can be determined by known methods such as the BCA-method or the biuret method.

The builders Z4) as well as other ingredients which may be used in detergent compositions according to the invention are disclosed, e.g. in US 2010/0160204 and EP-A 1757676.

The builders Z4), if present, may be selected, e.g., from the group consisting of carbonates, bicarbonates, organic builders, preferably methylglycinediacetic acid (MGDA), silicates, phosphates, phosphonates and alkali metal hydroxides.

Preference is given to the use of carbonate(s) and/or bicarbonate(s), preferably alkali metal carbonate(s), more preferably sodium carbonate.

These substances are preferably used in amounts of from 2 to 50 wt.-%, preferably from 10 to 40 wt.-% and in particular from 25 to 35 wt.-%, based on the total weight of the detergent composition according to the invention. Organic builders include polycarboxylates, polycarboxylic acids, polymeric carboxylates, aspartic acid, polyacetals, and dextrins. Useful organic builders are, among others, polycarboxylic acids usable in the form of the free acid and/or their sodium salts, wherein polycarboxylic acids are understood as those carboxylic acids which carry more than one acid moiety. For example, these may be citric acid, adipic acid, succinic acid, glutaric acid, malic acid, tartaric acid, maleic acid, fumaric acid, sugar acids, aminocarboxylic acids and nitrilotriacetic acid (NTA) and mixtures thereof. In addition to their builder effect, the free acids typically also have the property of an acidifying agent and thus also serve to set a lower and milder pH for the detergent composition according to the invention. In particular, citric acid, succinic acid, glutaric acid, adipic acid, gluconic acid, tartaric acid and any mixtures thereof are suitable.

Common aminocarboxylic acids that are preferred in the context of the present invention are, for example, ethylenediaminetetraacetic acid (EDTA), methylglycine-diacetic acid (MGDA) and glutamic diacetic acid (GLDA) or mixtures thereof.

Further preferred builders are polymeric aminodicarboxylic acids, their salts or their precursors. Particular preference is given to using polyaspartic acids, their salts or their derivatives.

Particularly advantageous for the cleaning and rinse aiding properties of the detergent composition according to the invention is the use of citric acid and/or citrates. Preference is given to detergent compositions which contain citric acid or a salt of citric acid, the weight fraction of citric acid or of the salt of citric acid preferably being from 2 to 50 wt.-%, more preferably from 5 to 30 wt.-% and even more preferably from 10 to 30 wt.-%, based on the total weight of the detergent composition.

In another preferred embodiment of the invention, the detergent compositions according to the invention contain MGDA as one of their builders. Detergent compositions according to the invention preferably contain from 0.5 to 25 wt.-%, more preferably from 2 to 25 wt.-% of MGDA, based on the total weight of the detergent composition.

As organic builders, polymeric carboxylates are also suitable. These are, for example, the alkali metal salts of polyacrylic acid or polymethacrylic acid, for example, those having a molecular weight of 500 to 70,000 g/mol. Suitable polymeric carboxylates are in particular polyacrylates which preferably have a molecular weight of 2,000 to 20,000 g/mol. Because of their superior solubility, the short-chain polyacrylates which have molar masses of from 2,000 to 10,000 g/mol and more preferably from 3,000 to 5,000 g/mol are even more preferred in this group.

Also suitable are copolymeric carboxylates. Suitable comonomers are mono-ethylenically unsaturated dicarboxylic acids such as maleic acid, fumaric acid, maleic anhydride, itaconic acid and citraconic acid. Particularly suitable are copolymeric carboxylates of acrylic acid with methacrylic acid and of acrylic acid or methacrylic acid with maleic acid and/or fumaric acid. Copolymers of acrylic acid with maleic acid which contain 50 to 90 wt.-% of acrylic acid and 10 to 50 wt.-% of maleic acid have proven to be particularly suitable. Their molecular weight relative to free acids is preferably from 2,000 to 70,000 g/mol, more preferably from 20,000 to 50,000 g/mol and in particular from 30,000 to 40,000 g/mol. It is also possible to use copolymers of at least one monomer selected from the group consisting of monoethylenically unsaturated $C_3$-$C_{10}$-mono- or $C_4$-$C_{10}$-dicarboxylic acids or their anhydrides, such as maleic acid, maleic anhydride, acrylic acid, methacrylic acid, fumaric acid, itaconic acid and citraconic acid with at least one hydrophilic or hydrophobic modified monomer, as listed below.

Suitable hydrophobic monomers are, for example, isobutene, diisobutene, butane, pentene, hexene and styrene, olefins having 10 or more carbon atoms or mixtures thereof, for example 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having a number-average of 12 to 100 carbon atoms per molecule.

Suitable hydrophilic monomers are monomers with sulfonate or phosphonate groups and nonionic monomers with hydroxyl function or alkylene oxide groups and optionally other ionogenic or nonionogenic monomers. Examples of the above listed hydrophilic monomers are allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth) acrylate. Polyalkylene glycols may contain 3 to 50, in particular 5 to 40 and especially 10 to 30 alkylene oxide units per molecule.

Particularly preferred monomers containing sulfonic acid groups are 1-acrylamido-1-propanesulfonic acid, 2-acrylamido-2-propanesulfonic acid, 2-acrylamido-2-methylpropanesulfonic acid (2-acryloylamino-2-methylpropane-sulfonic acid), 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy) propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropylmethacrylate, sulfomethacrylamide, sulfomethylmethacrylamide and salts of said acids, such as their sodium, potassium or ammonium salts.

Particularly preferred phosphonate group-containing monomers are vinylphosphonic acid and its salts. Moreover, amphoteric polymers can also be used as builders.

When the detergent composition according to the invention comprises one or more (co)polymeric carboxylates, the amount of these (co)polymeric carboxylates in the detergent composition according to the invention is preferably 0.5 to 20 wt.-% by weight and in particular 3 to 10 wt.-%, based on the total weight of the detergent composition.

Oxidisuccinates and other derivatives of disuccinates, preferably ethylenediamine disuccinate are further preferred organic builders, often referred to as co-builders. Among these, ethylenediamine-N,N'-disuccinate (EDDS) is preferred, especially used in the form of its sodium or magnesium salts. Furthermore, as a builder or co-builder preferred in this context are glycerol disuccinates and glycerol trisuccinates.

The detergent composition according to the invention may preferably contain builders of crystalline sodium sheet silicates of the general formula $NaMSi_xO_{2x+1}\cdot yH_2O$, wherein M is sodium or hydrogen, x is a number from 1.9 to 22, preferably from 1.9 to 4, more preferably 2, 3 or 4, and y is a number from 0 to 33, preferably from 0 to 20.

The detergent composition according to the invention preferably contains the crystalline sodium sheet silicates of formula $NaMSi_xO_{2x+1}\cdot yH_2O$ in an amount of 0.1 to 20 wt.-%, more preferably from 0.2 to 15 wt.-%, even more preferably from 0.4 to 10 wt.-%, based on the total weight of the detergent composition.

It is also possible to use amorphous sodium silicates having a modulus $Na_2O:SiO_2$ of from 1:2 to 1:3.3, preferably from 1:2 to 1:2.8 and in particular from 1:2 to 1:2.6, which preferably show delayed dissolution. The dissolution delay compared to conventional amorphous sodium silicates can be caused in different ways, for example by surface treatment, compounding, compaction, condensing or overdrying. In the context of this invention, the term "amorphous" means that the silicates do not produce sharp X-ray reflections typical of crystalline substances in X-ray diffraction experiments, but at most cause one or more maxima of the scattered X-ray radiation, which have a width of multiple degrees of the diffraction angle.

Alternatively, or in combination with the aforementioned amorphous sodium silicates X-ray-amorphous silicates can be used, the silicate particles of which show blurred or even sharp diffraction maxima in Electron diffraction experiments.

This is to be interpreted as meaning that the products have microcrystalline regions of the size of ten to a few hundred nm, with values of up to a maximum of 50 nm and in particular up to a maximum of 20 nm being preferred. Such X-ray amorphous silicates also have a dissolution delay compared to the conventional water glasses. Particularly preferred are condensed/compacted amorphous silicates, compounded amorphous silicates and overdried X-ray-amorphous silicates. In the context of the present invention, it is preferred that these silicates, preferably alkali metal silicates, particularly preferably crystalline or amorphous alkalidisilicates, are present in the detergent composition according to the invention in amounts of from 3 to 60 wt.-%, preferably from 8 to 50 wt.-% and more preferably from 20 to 40 wt.-%, based on the total weight of the detergent composition.

Phosphates have proven to be effective builders in terms of cleaning performance. Among the large number of commercially available phosphates, the alkali metal phosphates have the greatest importance in the washing and cleaning industry, in particular pentasodium triphosphate or pentapotassium triphosphate (sodium or potassium tripolyphosphate).

Alkali metal phosphates is the summary term for the alkali metal salts (especially sodium and potassium salts) of the various phosphoric acids such as metaphosphoric acids $(HPO_3)_m$, orthophosphoric acid $H_3PO_4$ and higher molecular weight representatives. The phosphates combine several advantages: they act as alkali metal carriers, prevent lime deposits on machine parts and contribute to the cleaning performance of the detergent composition.

Technically particularly important phosphates are the pentasodium triphosphate $Na_5P_3O_{10}$ (sodium tripolyphosphate) and the corresponding potassium salt pentapotassium triphosphate $K_5P_3O_{10}$ (potassium tripolyphosphate). The sodium potassium tripolyphosphates are also preferably used according to the invention. If phosphates are used in the detergent composition according to the invention, preferred agents comprise phosphate(s), preferably alkali metal phosphate(s), more preferably pentasodium or pentapotassiumtriphosphat (sodium or potassium tripolyphosphate), in amounts of from 2 to 50 wt.-%, preferably from 2 to 30 wt.-%, more preferably from 3 to 25 wt.-% and particularly preferably from 3 to 15 wt.-%, based on the total weight of the detergent composition.

As further builders, the detergent composition according to the invention may contain one or more phosphonates, which are often referred to as co-builders. The amount of phosphonates in the detergent composition according to the invention is preferably 0.5 to 20 wt.-% and more preferably 1.0 to 10 wt.-%, based on the total weight of the detergent composition.

The chelating phosphonates include a number of different compounds such as 1-hydroxyethane-1,1-diphosphonic acid (HEDP) or diethylenetriamine penta (methylenephosphonic acid) (DTPMP). Particularly preferred are hydroxyalkane and aminoalkane phosphonates. Among the hydroxyalkane phosphonates, 1-hydroxyethane-1,1-diphosphonate (HEDP) is of particular importance, preferably as a co-builder. It is preferably used as a sodium salt, of which the disodium salt reacts neutral and the tetrasodium salt reacts alkaline (pH 9). As aminoalkanphosphonates, ethylenediamine tetramethylene phosphonate (EDTMP), diethylenetriamine pentamethylenephosphonate (DTPMP) and their higher homologues, among others, are applicable. They are preferably used in the form of neutral reacting sodium salts (e.g. as the hexasodium salt of EDTMP or as hepta- and octasodium salt of DTPMP). From the class of phosphonates, HEDP is preferably used.

Detergent compositions according to the invention can contain, as further builders, alkali metal hydroxides. These alkali carriers are preferably only used in small amounts, typically in amounts of 10 wt.-% or less, preferably 6 wt.-% or less, more preferably 5 wt.-% or less, even more preferably 0.1 to 5 wt.-% and in particular 0.5 to 5 wt.-%, based on the total weight of the detergent composition.

In a further preferred embodiment of the invention, the detergent composition according to the invention comprises one or more builders from the group of organic builders. In a particularly preferred embodiment of the invention, the detergent composition contains one or more builders from the group consisting of citrate, methylglycinediacetic acid (MGDA) and ethylenediamine-N,N'-disuccinate (EDDS). In a particularly preferred embodiment of the invention, the detergent compositions according to the invention contain MGDA, specifically its trisodium salt.

The detergent composition according to the invention can contain said builders both individually and in the form of mixtures of two, three, four or more builders. In a preferred embodiment of the invention, the detergent composition according to the invention does not contain any phosphate builders.

The detergent composition according to the invention contains the one or more builders of component Z4), preferably in amounts of from 2 to 75 wt.-%, more preferably in amounts of from 10 to 75 wt.-% and especially preferably in amounts of from 40 to 75 wt.-%, based on the total weight of the detergent composition.

The bleaching agent Z5) of the detergent composition according to the invention, if present, preferably contains one or more substances selected from the group consisting of bleaches, bleach activators and bleach catalysts.

As bleach, the detergent composition according to the invention may contain an oxygen bleach. Among these oxygen bleaches, which yield $H_2O_2$ in water, sodium percarbonate, sodium perborate tetrahydrate and sodium perborate monohydrate are of particular importance. Further applicable bleaches are, for example, peroxypyrophosphates, citrate perhydrates and $H_2O_2$-yielding peroxy acid salts or peroxy acids, such as peroxy benzoates, peroxy phthalates, diperoxy azelaic acid, phthaloiminoperoxy acid or diperoxy dodecanedioic acid. Organic bleaches can also be used. Typical organic bleaches are diacyl peroxides, such as dibenzoyl peroxide. Other typical organic bleaches are the peroxy acids, such as alkyl peroxy acids and aryl peroxy acids.

The detergent composition according to the invention preferably comprises one or more bleaches selected from the group consisting of oxygen bleaches, peroxy pyrophosphates, citrate perhydrates, and $H_2O_2$-delivering peroxy acid salts or peroxy acids and organic bleaches. Particularly preferably, the detergent composition according to the invention contains 1.0 to 20 wt.-%, preferably 4.0 to 18 wt.-% and more preferably 8 to 15 wt.-% of an oxygen bleach, preferably sodium percarbonate, based on the total weight of the detergent composition.

To achieve an improved bleaching effect when dishwashing at temperatures of about 60° C. and below, the inventive detergent composition according to the invention may additionally contain one or more bleach activators. Preferably, the one or more bleach activators are selected from the group consisting of which, under the conditions of perhydrolysis, result in aliphatic peroxycarboxylic acids having preferably 1 to 10 carbon atoms, in particular 2 to 4 carbon atoms, and/or optionally substituted perbenzoic acid.

Suitable substances are those which carry O- and/or N-acyl groups with the above-stated number of carbon atoms and/or optionally substituted benzoyl groups. Preference is given to polyacylated alkylenediamines, with tetraacetylethylenediamine (TAED) being particularly suitable.

Bleach activators, in particular TAED, are preferably used in amounts of up to 10 wt.-%, more preferably in amounts of from 0.1 to 8 wt.-% even more preferably in amounts of from 2 to 8 wt.-% and particularly preferably in amounts from 2 to 6 wt.-%, based on the total weight of the detergent composition according to the invention.

In addition to, or in place of, the conventional bleach activators, so-called bleach catalysts can also be used. These substances are bleach-enhancing transition metal salts or transition metal complexes such as Mn, Fe, Co, Ru or Mo-salen complexes or carbonyl complexes. Mn, Fe, Co, Ru, Mo, Ti, V and Cu complexes with nitrogen-containing tripod ligands and Co, Fe, Cu and Ru amine complexes can also be used as bleach catalysts.

It is particularly preferred to use complexes of manganese in the oxidation state II, III, IV or V, which preferably contain one or more macrocyclic ligands with donor functions N, NR, PR, O and/or S. Preferred are ligands having nitrogen donor functions. It is particularly preferred to use bleach catalyst(s) which contain as macromolecular ligands 1,4,7-trimethyl-1,4,7-triazacyclononane (Me-TACN), 1,4,7-triazacyclononane (TACN), 1,5,9-trimethyl-1,5,9-triazacyclododecane (Me-TACD), 2-methyl-1,4,7-trimethyl-1,4,7-triazacyclononane (Me/Me-TACN) and/or 2-methyl-1,4,7-triazacyclononane (Me/TACN). Suitable manganese complexes are, for example, $[Mn^{III}_2(\mu\text{-}O)_1(\mu\text{-}OAc)_2(TACN)_2](ClO_4)_2$, $[Mn^{III}Mn^{IV}(\mu\text{-}O)_2(\mu\text{-}OAc)_1(TACN)_2](BPh_4)_2$, $[Mn^{IV}_4(\mu\text{-}O)_6(TACN)_4](ClO_4)_4$, $[Mn^{III}_2(\mu\text{-}O)_1(\mu\text{-}OAc)_2(Me\text{-}TACN)_2](ClO_4)_2$, $[Mn^{III}Mn^{IV}(\mu\text{-}O)_1(\mu\text{-}OAc)_2(Me\text{-}TACN)_2](ClO_4)_3$, $[Mn^{IV}_2(\mu\text{-}O)_3(Me\text{-}TACN)_2](PF_6)_2$ and $[Mn^{IV}_2(\mu\text{-}O)_3(Me/Me\text{-}TACN)_2](PF_6)_2$($OAc{=}OC(O)CH_3$).

In a further preferred embodiment of the invention, the detergent composition according to the invention comprises one or more bleach catalysts from the group of bleach-enhancing transition metal salts and transition metal complexes, preferably from the group of the complexes of manganese with 1,4,7-trimethyl-1,4,7-triazacyclononane (Me-TACN) and 1,2,4,7-tetramethyl-1,4,7-triazacyclononane ($Me_4$-TACN), since the cleaning result can be significantly improved by these bleach catalysts.

Preferably, the bleaching agent Z5) comprises one or more bleaches and one or more substances from the group of bleach activators and bleach catalysts. More preferably, the bleaching agent comprises one or more bleaches, one or more bleach activators, and one or more bleach catalysts.

The detergent composition according to the invention contains the bleaching agent of component Z5) preferably in amounts of 1 to 40 wt.-%, more preferably in amounts of 0.5 to 30 wt.-% and even more preferably in amounts of 3 to 25 wt.-%, based on the total weight of the detergent composition.

The one or more surfactants of component Z6) of the detergent composition according to the invention, if present, are preferably selected from the group consisting of nonionic surfactants, zwitterionic surfactants, anionic surfactants, cationic surfactants and mixtures thereof.

The one or more nonionic surfactants of component Z6) of the detergent composition according to the invention preferably have a cloud point of 40 to 60° C.

The detergent composition according to the invention contains the one or more nonionic surfactants of component Z6) preferably in amounts of from 0 to 15 wt.-%, more preferably in amounts of from 0.1 to 10 wt.-% and even more preferably in amounts of 0.2 to 5 wt.-%, in each case based on the total weight of the detergent composition.

Preference is also given to detergent compositions according to the invention, where the one or more surfactants of component Z6) are selected from the group of one or more fatty alcohol alkoxylates of the formula (XIV)

$$R_aO—(AO)_x—H, \tag{XIV}$$

in which $R_a$ is a linear or branched saturated alkyl group having 8 to 30 carbon atoms, or a linear or branched unsaturated alkenyl group having one or more double bonds and 8 to 30 carbon atoms, A is selected from the group consisting of $—C_2H_4—$ and $—C_3H_6—$, x is a number from 1 to 150.

Examples for the alkyl- and alkenyl-groups of $R_a$ of formula (XIV) of component Z6) are, e.g. the alkyl and alkenyl groups of the following alcohols $R_a$—OH: 1-octanol (caprylic alcohol), 2-ethylhexanol, 1-nonanol (pelargonic alcohol), 1-decanol (capric alcohol), 1-undecanol, 1-dodecanol (lauryl alcohol), 1-tridecanol, isotridecanol, 1-tetradecanol (myristyl alcohol), 1-pentadecanol, 1-hexadecanol (cetyl alcohol), cis-9-hexadecene-1-ol (palmitoleyl alcohol), 1-heptadecanol, 1-octadecanol (stearyl alcohol), cetearyl alcohol, 16-methylheptadecan-1-ol (isostearyl alcohol), 9E-octadecene-1-ol (elaidyl alcohol), cis-9-octadecene-1-ol (oleyl alcohol), oleyl cetyl alcohol (i.e., a mixture of oleyl alcohol and cetyl alcohol), 9Z, 12Z-octadecadien-1-ol (linoleyl alcohol), 9E, 12E-octadecadien-1-ol (elaidolinoleyl alcohol), 9Z, 12Z, 15Z-octadecatrien-1-ol (linolenyl alcohol), 9E,12E,15E-octadecatriene-1-ol (elaidolinolenyl alcohol), 1-nonadecanol, 1-eicosanol (arachidyl alcohol), 1-heneicosanol, 1-docosanol (behenyl alcohol), cis-13-docosen-1-ol (erucyl alcohol), 1-tetracosanol (lignoceryl alcohol), 1-hexacosanol (ceryl alcohol), 1-octacosanol (montanyl alcohol) and 1-triacontanol (myricyl alcohol) or mixtures thereof.

$R_a$ in formula (XIV) preferably represents a linear or branched saturated alkyl group having 8 to 22 carbon atoms or a linear or branched unsaturated alkenyl group having one or more double bonds and 8 to 22 carbon atoms, more preferably a linear or branched saturated alkyl group having 8 to 18 carbon atoms or a linear or branched unsaturated alkenyl group having one or more double bonds and 8 to 18 carbon atoms, and particularly preferably a linear or branched saturated alkyl group having 12 to 15 carbon atoms or a linear or branched unsaturated alkenyl group having one or more double bonds and 12 to 15 carbon atoms.

Preferably, the groups $R_a$ in formula (XIV) are alkyl groups.

Preferably, x in formula (XIV) is a number from 1 to 50, more preferably from 1 to 20, and even more preferably from 5 to 20.

The variable "x" in the one or more compounds of formula (XIV) represents molar averages, i.e. the detergent composition according to the invention may contain several compounds of formula (XIV) with different degrees of alkoxylation.

In a further preferred embodiment of the invention, the group $-(-AO—)_x—$ contains one or more $—C_2H_4O$ groups and one or more $—C_3H_6O$ groups. In this preferred embodiment of the invention, the molar amount of the $—C_3H_6O$ groups, based on the total amount of $—C_2H_4O$ and $—C_3H_6O$ groups, is preferably less than 50%, more preferably 45% or less than 45%, even more preferably 40% or less than 40% and particularly preferably 33% or less than 33%.

In a preferred embodiment of the invention, the molar amount of $—C_3H_6O$ groups, based on the total amount of —$C_2H_4O$ and —$C_3H_6O$ groups, is preferably 20 to less than 50%, more preferably 33 to 45%, and even more preferably 33 to 40%.

The molar amount of the —$C_3H_6O$ groups, based on the total amount of —$C_2H_4O$ and —$C_3H_6O$ groups, is preferably 20% or less than 20% and particularly preferably 10% or less than 10%.

In a particularly preferred embodiment of the invention, compounds of the formula (XIV) contain a molar average of 8 —$C_2H_4O$ groups and 4 —$C_3H_6O$ groups and $R_a$ represents a linear or branched saturated alkyl group having 12 to 15 carbon atoms or a linear or branched unsaturated alkenyl group having one or more double bonds and 12 to 15 carbon atoms.

Preference is also given to detergent compositions according to the invention, where the one or more surfactants of component Z6) are selected from the group of N-acylglucamines, which are also known as N-1-deoxysorbityl fatty acid amides or glucamides, of the formula (VI), (VI)

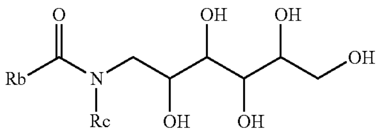

wherein

Rb is a linear or branched saturated alkyl group having 11 to 21 carbon atoms or a linear or branched unsaturated alkenyl group having one or more double bonds and 11 to 21 carbon atoms and Rc is hydrogen or a linear or branched saturated alkyl group having 1 to 4 carbon atoms.

Preferably, in the one or more N-acylglucamines of formula (VI), Rc is a methyl group.

In the one or more N-acylglucamines of the formula (VI), Rb is preferably a linear or branched saturated alkyl group having 11 to 17 carbon atoms or a linear or branched unsaturated alkenyl group with one or more double bonds and 11 to 17 carbon atoms.

More preferably, in the one or more N-acylglucamines of formula (VI) Rb is a linear or branched saturated alkyl group having 15 to 17 carbon atoms or a linear or branched unsaturated alkenyl group having one or more double bonds and 15 to 17 carbon atoms.

In a preferred embodiment of the invention, 50 wt.-% or more, more preferably 60 to 99 wt.-% and even more preferably 70 to 98 wt.-% of the groups Rb in the one or more N-acylglucamines of the formula (VI) are linear or branched saturated alkyl groups with 17 carbon atoms.

In a further preferred embodiment of the invention, 0.1 to 50 wt.-%, more preferably 0.5 to 40 wt.-% and even more preferably 1.0 to 30 wt.-% of the groups Rb in the one or more N-acylglucamines of the formula (VI) are linear or branched saturated alkyl groups with 15 carbon atoms.

In a further preferred embodiment of the invention, 50 wt.-% or more of the Rb groups in the one or more N-acylglucamines of the formula (VI) are linear or branched unsaturated alkenyl groups having one or more double bonds.

In a particularly preferred embodiment of the invention 50 wt.-% or more, more preferably 80 wt.-% or more and even more preferably 90 wt.-% or more of the groups Rb in the one or more N-acylglucamines of the formula (VI) are linear or branched alkenyl groups having one or more double bonds and 17 carbon atoms. Particularly preferably, in the one or more N-acylglucamines of formula (VI), Rb is a linear group.

In another preferred embodiment of the invention, in the one or more N-acylglucamines of formula (VI) RbCO derives from lauric acid, palmitic acid, stearic acid, oleic acid, linoleic acid or linolenic acid. In a more preferred embodiment of the invention, in the one or more N-acylglucamines of the formula (VI) RbCO derives from stearic acid, oleic acid, linoleic acid or linolenic acid. In an even more preferred embodiment of the invention, in the one or more N-acylglucamines of formula (VI), RbCO derives from oleic acid, linoleic acid or linolenic acid, and in a particularly preferred embodiment of the invention, in the one or more N-acylglucamines of formula (V) RbCO derives from oleic acid.

Suitable cationic surfactants of component Z6), which may be used instead of or together with the other surfactants mentioned herein, are, e.g., surfactants of formulae (VII), (VIII) and/or (IX), (VII)

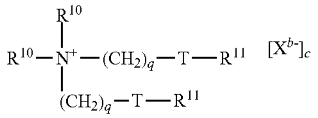

(VIII)

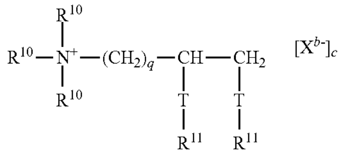

(IX)

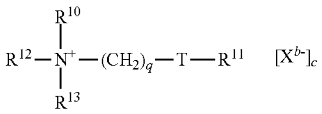

wherein each $R^{10}$ group is independently selected from linear or branched, preferably linear, saturated alkyl groups having 1 to 6 carbon atoms, linear or branched, preferably linear, unsaturated alkenyl groups having one or more double bonds and 2 to 6 carbon atoms, and linear or branched, preferably linear, hydroxyalkyl groups having 1 to 6 carbon atoms;

each $R^{11}$ group is independently selected from linear or branched saturated alkyl groups having 8 to 28 carbon atoms, linear or branched unsaturated alkenyl groups having one or more double bonds and 8 to 28 carbon atoms;

$R^{12}$ is the same as $R^{10}$ or $(CH_2)_n$-T-$R^{11}$;

$R^{13}$ is the same as $R^{10}$, $R^{11}$ or $(CH_2)_n$-T-$R^{11}$;

T is selected from —$CH_2$—, —O—CO— or —CO—O—;

q is an integer from 0 to 5;

X is an inorganic or organic anion having the charge b-;

b is a number from 1 to 4; and c is a number having a value of 1/b.

Further cationic surfactants suitable as component Z6) of the detergent composition according to the invention are compounds of formula (X), (X)

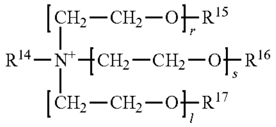

wherein $R^{14}$ is a linear or branched, preferably linear, saturated alkyl group having from 1 to 6 carbon atoms;

$R^{15}$, $R^{16}$ and $R^{17}$ are equal or different and are independently selected from the group consisting of hydrogen, linear or branched saturated alkyl groups having from 1 to 18 carbon atoms, linear or branched unsaturated alkenyl groups having one or more double bonds and from 2 to 18 carbon atoms, and —CO—$R^{18}$;

$R^{18}$ is a linear or branched saturated alkyl group having 7 to 19 carbon atoms or a linear or branched unsaturated alkenyl group having one or more double bonds and 7 to 19 carbon atoms;

r, s and t are equal or different and are independently a number from 0 to 50;

X is an inorganic or organic anion having the charge b-;

b is a number from 1 to 4; and c is a number having a value of 1/b;

with the proviso that at least one group of $R^{15}$, $R^{16}$ and $R^{17}$ is —CO—$R^{18}$ which forms an ester moiety with the oxygen atom of an ethoxy group;

the sum of r+s+t is a number from 1 to 70; and if one or more of r, s and/or t is 0, the corresponding group $R^{15}$, $R^{16}$ and/or $R^{17}$ is a linear or branched saturated alkyl group having 1 to 18 carbon atoms or a linear or branched unsaturated alkenyl group having 2 to 18 carbon atoms.

Preferable zwitterionic surfactants applicable as component Z6) are selected from the group consisting of $C_8$ to $C_{18}$, preferably $C_{12}$ to $C_{18}$ amine oxides and sulfo- and hydroxyl betaines, such as N-alkyl-N,N-dimethylamino-1-propanesulfonate, wherein the alkyl group may be $C_9$ to $C_{18}$, preferably $C_{10}$ to $C_{14}$.

Preferable anionic surfactants applicable as component Z6) are selected from alkyl ethoxysulfates having a degree of ethoxylation of more than 3, more preferably 4 to 10 and even more preferably 6 to 8 and an alkyl chain length in the range of $C_8$ to $C_{16}$ and preferably $C_{11}$ to $C_{15}$. In addition, branched alkyl carboxylates have been found to be useful for the purposes of the present invention when the branching occurs in the middle and the average total chain length is 10 to 18, preferably 12 to 16 with a side chain length of 2 to 4 carbon atoms. An example of this is 2-butyloctanoic acid. The anionic surfactant is usually of a type having good solubility in the presence of calcium. Furthermore, alkyl (polyethoxy) sulfates (AES), alkylbenzene sulfonates and short-chain $C_6$-$C_{10}$-alkyl sulfates and sulfonates are among such anionic surfactants. It has been revealed that straight-chain fatty acids are ineffective because of their sensitivity to calcium.

In preferred embodiments, the detergent composition according to the invention comprises cationic and/or zwitterionic surfactants of component Z6) in amounts smaller than 6 wt.-%, preferably smaller than 4 wt.-%, more preferably smaller than 2 wt.-%, even more preferably smaller than 1 wt.-%, in each case based on the total weight of the detergent composition.

The detergent compositions according to the invention comprise the one or more surfactants of component Z6) preferably in amounts of from 0.1 to 15 wt.-%, more preferably in amounts of from 0.2 to 10 wt.-%, and even more preferably in amounts of from 0.2 to 5 wt.-%, in each case based on the total weight of the detergent composition.

Suitable polymers of component Z7) include washing or cleaning-active polymers, for example rinse aid polymers and/or polymers which act as softeners. In general, the detergent composition according to the invention may include, as polymers of component Z7), nonionic, cationic, anionic and/or amphoteric polymers.

Cationic polymers in the context of the present invention are polymers which carry a positive charge in the polymer molecule. This can be realized, for example, by (alkyl) ammonium groups or other positively charged groups present in the polymer chain. Particularly preferred cationic polymers come from the groups of quaternized cellulose derivatives, polysiloxanes with quaternary groups, cationic guar derivatives, polymeric dimethyldiallylammonium salts and their copolymers with esters and amides of acrylic acid and methacrylic acid, copolymers of vinylpyrrolidone with quaternized derivatives of dialkylaminoacrylates and methacrylates, vinylpyrrolidone-methoimidazolinium chloride copolymers, quaternized polyvinyl alcohols, or polymers having the INCI names polyquaternium 2, polyquaternium 17, polyquaternium 18 and polyquaternium 27.

If cationic polymers are used in component Z7), they are particularly preferably copolymers comprising polyalkylene oxide groups and quaternary nitrogen atoms. More preferably the cationic polymers of component Z7) are copolymers comprising 0.1 to 99.9 mol-%, preferably 20.0 to 80.0 mol-%, more preferably 22.0 to 77.6 mol-% of one or more cationic structural units (D); and 0.1 to 99.9 mol-%, preferably 0.4 to 20.0 mol-%, more preferably 0.5 to 4.4 mol-% of one or more macromonomeric structural units (E), wherein the one or more cationic structural units (D) are represented by the following general formulae (XVI) and/or (XII):

(XVI)

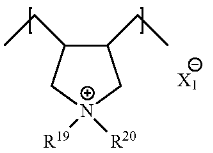

(XII)

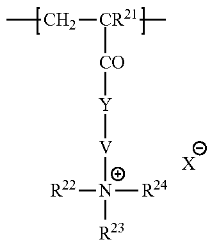

wherein $R^{19}$ and $R^{21}$ are equal or different and are independently selected from hydrogen and/or a methyl group;

$R^{20}$, $R^{22}$, $R^{23}$ and $R^{24}$ are equal or different and are independently selected from the group consisting of hydrogen, an aliphatic hydrocarbon residue having 1 to 20, preferably 1 to 4 carbon atoms, a cycloaliphatic hydrocarbon residue having 5 to 20, preferably 5 to 8 carbon atoms, an aryl group having 6 to 14 carbon atoms and/or polyethylene glycol (PEG), and preferably are equal or different and independently selected from the group consisting of hydrogen and/or methyl, and particularly preferably are methyl;

Y is the same or different and is selected from oxygen, NH and/or $NR^{22}$,

V is the same or different and is selected from $-(CH_2)_x-$,

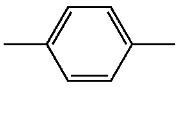 and/or 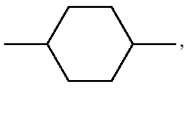,

X is the same or different and is a number from 1 to 6;

X and $X_1$ are equal or different and are independently selected from a halogen atom, $C_1$ to $C_4$-alkylsulfate and/or $C_1$ to $C_4$ alkylsulfonate; and the one or more macromonomeric structural units (E) are represented by the following general formula (XIII):

(XIII)

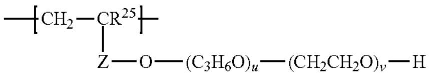

wherein $R^{25}$ is the same or different and is H and/or methyl;

Z is the same or different and is C═O and/or $O(CH_2)_4$, preferably $O(CH_2)_4$, u is, on molar average, a number from 0 to 7, preferably from 0 to 6; and v is, on molar average, a number from 1 to 150, preferably from 11 to 150, more preferably from 12 to 150.

Amphoteric polymers in the context of the present invention have, alongside positively charged groups, also negatively charged groups or monomeric units in the polymer chain. These negatively charged groups or monomeric units may be derived, e.g. from carboxylic acids, sulfonic acids ot phosphonic acids.

Preferable amphoteric polymers applicable in component Z7) of the detergent composition according to the invention are selected from the group consisting of alkylacrylamide/acrylic acid-copolymers, alkylacrylamide/methacrylic acid copolymers, alkylacrylamide/methylmethacrylic acid copolymers, alkylacrylamide/acrylic acid/alkyl aminoalkyl (meth)acrylic acid copolymers, alkylacrylamide/methacrylic acid/alkylaminoalkyl (meth)acrylic acid copolymers, alkylacrylamide/methylmethacrylic acid/alkylaminoalkyl (meth)acrylic acid copolymers, alkylacrylamide/alkylmethacrylate/alkylaminoethylmethacrylate/alkylmethacrylate copolymers, and copolymers of unsaturated carboxylic acids, cationically derivatized unsaturated carboxylic acids and optionally further ionic or non-ionic monomers.

Further preferably applicable amphoteric polymers are selected from the group consisting of acrylamidoalkyltrialkylammonium chloride/acrylic acid copolymers and their alkaline metal or ammonium salts, acrylamidoalkyltrialkylammonium chloride/methacrylic acid copolymers and their alkaline metal or ammonium salts, and methacroylethylmetaine/methacrylate copolymers.

If the detergent composition according to the invention contains cationic and/or amphoteric polymers in component Z7), these polymers are preferably present in amounts of from 0.01 to 10 wt.-%, based on the total weight of the detergent composition. In the context of the present invention, preference is given to those detergent compositions, in which the weight fraction of the cationic and/or amphoteric polymers is from 0.01 to 8 wt.-%, preferably 0.01 to 4 wt.-%, more preferably from 0.01 to 2 wt.-%, even more preferably 0.01 to 1 wt.-%, based on the total weight of the detergent composition.

Another group of preferably applicable polymers applicable in component Z7) of the detergent composition according to the invention are alkoxylated polyalkyleneimines. Alkoxylated polyalkyleneimines have a polyalkyleneimine backbone and alkoxy chains. Preferably, the polyalkyleneimine is polyethyleneimine. More preferably, the alkoxylated polyalkyleneimine is not quaternized.

If the detergent composition according to the invention comprises alkoxylated polyalkyleneimines in component Z7), the composition preferably comprises from 1 to 10 wt.-%, more preferably from 1 to 8 wt.-% of alkoxylated polyalkyleneimines, based on the total weight of the detergent composition.

Preferably, the alkoxylated polyalkyleneimine used in component Z7) comprises 0.5 to 40 wt.-%, more preferably 1 to 30 wt.-%, even more preferably 2 to 20 wt.-% of the polyalkyleneimine backbone and 60 to 99 wt.-%, more preferably 60 to 95 wt.-%, even more preferably from 60 to 90 wt.-% of the alkoxy chains.

Preferably, the alkoxy chains have an average of from about 1 to about 50, more preferably from about 2 to about 40, even more preferably from about 3 to about 30, particularly preferably from about 3 to about 20, and especially preferably from about 4 to about 15 alkoxy units, which are preferably ethoxy units. In other suitable alkoxylated polyalkyleneimines for use in component Z7), the alkoxy chains have an average of from about 0 to 30, more preferably from about 1 to about 12, even more preferably from about 1 to about 10 and particularly preferably from about 1 to about 8 propoxy units. Especially preferred are alkoxylated polyethyleneimines wherein the alkoxy chains comprise a combination of ethoxy and propoxy chains, in particular polyethyleneimines comprising chains of from 4 to 20 ethoxy units and from 0 to 6 propoxy units.

Preferably, the alkoxylated polyalkyleneimine is obtained from alkoxylation wherein the starting polyalkyleneimine has a weight-average molecular weight of from about 100 to about 60,000, preferably from about 200 to about 40,000, more preferably from about 300 to about 10,000 g/mol. In a preferred embodiment, a polyethyleneimine with a weight average molecular weight of 600 g/mol ethoxylated with 20 EO groups per NH group is used as the alkoxylated polyalkyleneimine.

Other suitable polyalkyleneimines applicable in component Z7) of the detergent composition according to the invention include compounds having the following general structure: $bis((C_2H_5O)(C_2H_4O)_n)(CH_3)-N^+-C_xH_{2x}-N^+-(CH_3)-bis((C_2H_5O)(C_2H_{40})_n)$, wherein n is a number from 20 to 30, and x is a number from 3 to 8, or sulfated or sulfonated variants thereof.

The one or more further additives Z8) are preferably selected from the group consisting of chelating agents, glass corrosion inhibitors, water, organic solvents, thickeners, foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators.

Glass corrosion inhibitors prevent the occurrence of haze, streaks and scratches, but also iridescence of the glass surface of machine-cleaned glasses. Preferred glass corrosion inhibitors are, among others, magnesium, cobalt and zinc salts and magnesium, cobalt and zinc complexes.

Proteins and/or enzymes, such as those in component Z3), may be particularly sensitive to damage such as inactivation, denaturation or degradation during storage (e.g. by physical influences, oxidation or proteolytic cleavage). In the case of microbial recovery of the proteins and/or enzymes, inhibition of the proteolysis is particularly preferred, in particular if the detergent compositions according to the invention also contain proteases. Therefore, the detergent composition according to the invention may contain enzyme stabilizers. The provision of such agents in the detergent composition constitutes a particularly preferred embodiment of the invention.

Preferably, such detergent compositions according to the invention contain 0.1 to 12 wt.-%, more preferably 0.2 to 10 wt.-%, even more preferably 0.5 to 8 wt.-%, based on the total weight of the detergent composition, of such enzyme stabilizers.

The cleaning performance of the detergent composition according to the invention can be improved by the addition of organic solvents. A preferred embodiment of the present invention is therefore a detergent composition according to the invention which contains at least one organic solvent. Preferred liquid detergent compositions according to the invention contain organic solvent in amounts of from 0.2 to 15 wt.-%, more preferably in amounts of from 0.5 to 12 wt.-% and even more preferably in amounts of from 1.0 to 10 wt.-%, based on the total weight of the detergent composition.

These organic solvents are for example monoalcohols, diols, triols, polyols, ethers, esters and/or amides. Particular preference is given to organic solvents which are water-soluble. "Water-soluble" solvents in the sense of the present application are solvents which are completely miscible with water at room temperature (i.e., without miscibility gaps). The organic solvents from the group of organic amines and/or alkanolamines are effective in terms of cleaning performance and in particular with regard to the cleaning performance of bleachable soiling, especially on tea stains.

In order to achieve the desired viscosity of a liquid detergent composition according to the invention, thickeners can be added to this composition. In the detergent composition according to the invention, the thickeners commonly used in detergent compositions for machine dishwashing can be used.

Advantageously, liquid detergent compositions according to the invention contain one or more thickeners in amounts preferably from 0.1 to 8 wt.-%, more preferably from 0.2 to 6 wt.-% and even more preferably from 0.4 to 4 wt.-%, based on the total weight of the liquid detergent composition.

Foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators may be selected from the corresponding substances commonly used in detergent compositions for machine dishwashing.

Particularly preferably, the detergent composition according to the invention comprises Z1) 0.1 to 15 wt.-% of component Z1), Z2) 0.1 to 15 wt.-% of component Z2), Z3) $1\times10^{-6}$ to 5 wt.-% of component Z3), Z4) 2 to 75 wt.-% of component Z4), Z5) 1 to 40 wt.-% of component Z5), Z6) 0 to 15 wt.-% of component Z6), Z7) 0 to 10 wt.-% of component Z7), and Z8) 0 to 70 wt.-% of component Z8), in each case based on the total weight of the detergent composition.

In a further preferred embodiment, the detergent composition according to the invention contains no phosphate-based builders, and more preferably the detergent compositions according to the invention contains no phosphates, i.e. they are phosphate-free.

The detergent composition according to the invention can be prepared in solid or liquid form and as a combination of solid and liquid forms.

Preference is given to detergent compositions according to the invention, which are solid at 20° C. Powder, granules, extrudates or compactates, in particular tablets in single-phase or multiphase form are particularly suitable as solid forms. Tablets are formulated for single-dose applications. The solid detergent compositions according to the invention preferably contain 20 wt.-% or less than 20 wt.-% of water, more preferably 0.1 to 20 wt.-% of water and even more preferably 0.5 to 5 wt.-% of water, based on the total weight of the detergent composition. In another preferred embodiment of the invention, the detergent composition according to the invention is anhydrous.

In a particularly preferred embodiment of the invention, the solid detergent composition according to the invention is in the form of a tablet.

Preference is also given to detergent compositions according to the invention, which are wrapped or enclosed in a water-soluble foil, preferably in a water-soluble foil based on polyvinyl alcohol or a water-soluble polyvinyl alcohol containing foil.

In the context of the present invention, the term "water-soluble foil" means that the foil comprises a water-soluble polymer, copolymer or mixtures thereof in a weight fraction of at least 90 wt.-%, based on the total weight of the foil. Water-soluble polymers in the context of the present invention are polymers which are soluble in water at 25° C. to an amount of more than 2.5 wt.-%, based on the amount of water.

Preferable materials of the water-soluble foil are at least partially composed of a substance selected from the group consisting of polyvinyl alcohols, acetalized polyvinyl alcohols, polyvinylpyrrolidones, gelatine, polyvinyl alcohols substituted with sulfate, carbonate and/or citrate, polyalkylene oxides such as polyethylene oxides, acrylamides, cellulose esters, cellulose ethers, cellulose amides, cellulose, polyvinyl acetate, polycarboxylic acids and their salts, polyaminoacids or peptides, copolymers of acrylamides and (meth)acrylic acid, polysaccharides such as starch or guar derivatives, and compounds with the INCI names polyquaternium 2, polyquaternium 17, polyquaternium 18 and polyquaternium 27. In a particularly preferred embodiment, the material of the water-soluble foil comprises polyvinyl alcohol.

In a further preferred embodiment of the invention, the material of the water-soluble foil comprises mixtures of different substances, such as copolymers. Such mixtures enable the adjustment of the mechanical properties of the foil and the container formed thereof and may affect the degree of water solubility. Preferably, the water-soluble foil contains at least one polyvinyl alcohol and/or at least one polyvinyl alcohol copolymer.

In a further preferred embodiment, the detergent composition according to the invention is liquid at 20° C. The liquid formulation, preferably based on water and/or organic solvents, can be provided in a thickened form, as a gel. Capsules (caps) are particularly suited for liquid formulations in single-phase or multiphase form. Preferably, the liquid detergent composition according to the invention contains up to 60 wt.-% of water, more preferably from 10 to 60 wt.-% of water, even more preferably from 25 to 60 wt.-% of water, based on the total weight of the liquid detergent composition.

In a particularly preferred embodiment, the detergent composition according to the invention is present in the form of a powder, a gel, a pod or a cap or is provided as a liquid rinse aid.

The detergent compositions according to the invention may advantageously be used for the cleaning of dishes in a dishwashing machine. Therefore, a further subject matter of the invention is a method of cleaning dishes in a dishwashing machine, in which contaminated dishes are treated in the dishwashing machine with an aqueous alkaline composition comprising a detergent composition according to the invention.

In this method of cleaning dishes, the pH value of the aqueous alkaline composition is preferably 8 or above and more preferably 9 or above. In a particularly preferred embodiment, the pH value of the aqueous alkaline composition is from 8 to 13 and preferably from 9 to 12.

As already stated above, an advantage of the invention is that the detergent composition according to the invention and the mixture of component Z1) and component Z2) as defined for the detergent composition according to the invention show very good results as rinse aids during machinated dishwashing, especially in terms of improving wettability of dishes and/or the reduction and/or avoidance of stain and film formation, in particular fatty residue formation, on dishes, in the machine compartment and/or on the filter of the machine during machinated dishwashing.

Therefore, a further subject matter of the invention is the use of a detergent composition according to the invention or a mixture of component Z1) and component Z2) as defined for the detergent composition according to the invention as a rinse aid during machinated dishwashing.

A further subject matter of the invention is the use of a detergent composition according to the invention or a mixture of component Z1) and component Z2) as defined for the detergent composition according to the invention for improving the wettability of dishes during machinated dishwashing.

A further subject matter of the invention is the use of a detergent composition according to the invention or a mixture of component Z1) and component Z2) as defined for the detergent composition of the invention for the reduction and/or avoidance of stain and film formation, in particular fatty residue formation, on dishes, in the machine compartment and/or on the filter of the machine during machinated dishwashing.

A further advantage of the invention is that the detergent composition according to the invention and the mixture of component Z1) and component Z2) as defined for the detergent composition according to the invention may advantageously be used for the reduction and/or avoidance of malodor in a dishwasher. Therefore, a further subject matter of the invention is the use of a detergent composition according to the invention or a mixture of component Z1) and component Z2) as defined for the detergent composition according to the invention for the reduction and/or avoidance of malodor in a dishwasher.

Furthermore, the mixture of component Z1) and component Z2) as defined for the detergent composition according to the invention may advantageously be used for improving the rinse aiding properties and/or the drying capacity of a machine dishwashing detergent composition, preferably a detergent composition according to the invention. Therefore, a further subject matter of the invention is the use of a mixture of component Z1) and component Z2) as defined for the detergent composition according to the invention for improving the rinse aiding properties and/or the drying capacity of a machine dishwashing detergent composition, preferably of a detergent composition according to the invention.

The preferred embodiments described for the detergent composition for machine dishwashing according to the invention also apply correspondingly to the method according to the invention of cleaning dishes in a dishwashing machine, to the use according to the invention of a detergent composition according to the invention or of a mixture of component Z1) and component Z2) as defined for the detergent composition according to the invention as rinse aids during machinated dishwashing, for improving the wettability of dishes during machinated dishwashing, for the reduction and/or avoidance of stain and film formation, in particular fatty residue formation, on dishes, in the machine compartment and/or on the filter of the machine during machinated dishwashing, or for the reduction and/or avoidance of malodor in the dishwasher, and to the use according to the invention of a mixture of component Z1) and component Z2) as defined for the detergent compositions according to the invention for improving the rinse aiding properties and/or the drying capacity of a machine dishwashing detergent composition, preferably of a detergent composition according to the invention.

The invention is explained in more detail below by the examples without, however, limiting it thereto. Unless explicitly stated otherwise in the examples, the percentages in the examples are to be understood as percent by weight (wt.-%).

EXAMPLES

Synthesis Example 1

Methods of Preparation of Calcium-Based Catalyst (C) with Carboxylic Acid of Formula (III)

a) A mixture of 1047.0 g of a carboxylic acid of formula (III) under the trade name "Emulsogen COL 050" marketed by Clariant Produkte (Deutschland) GmbH, 55.8 g of calcium hydroxide and 360.6 g of propan-2-ol was agitated at ambient temperature for 5 minutes with a batch disperser (Ultra Turrax from IKA Werke GmbH & Co KG). After this, 44.2 g of concentrated sulfuric acid were added over 2 minutes and the mixture was again agitated for 5 minutes with the batch disperser, providing a catalyst with a $Ca^{2+}$ content of 2.00 wt.-% (henceforth "(C-1)").

Similar results for providing the catalyst with a $Ca^{2+}$ content of approximately 2.00 wt.-% can be obtained by using methane-sulfonic acid or sulfurous acid instead of sulfuric acid.

b) A mixture of 1047.0 g of a carboxylic acid of formula (III) under the trade name "Emulsogen COL 050"

marketed by Clariant Produkte (Deutschland) GmbH, 55.8 g of calcium hydroxide and 360.6 g of propan-2-ol was agitated at ambient temperature for 5 minutes with a batch disperser (Ultra Turrax from IKA Werke GmbH & Co KG). After this, 42.9 g of methanesulfonic acid (99 wt.-%) were added over 2 minutes and the mixture was again agitated for 5 minutes with the batch disperser, providing a catalyst with a $Ca^{2+}$ content of 2.00 wt.-% ("(C-3)").

c) A mixture of 1047.0 g of a carboxylic acid of formula (III) under the trade name "Emulsogen COL 050" marketed by Clariant Produkte (Deutschland) GmbH, 55.8 g of calcium hydroxide and 360.6 g of propan-2-ol was agitated at ambient temperature for 5 minutes with a batch disperser (Ultra Turrax from IKA Werke GmbH & Co KG). After this, 603.7 g of sulfurous acid (6 wt.-%) were added over 2 minutes and the mixture was again agitated for 5 minutes with the batch disperser. The solvent mixture was removed under vacuum, providing a catalyst with a $Ca^{2+}$ content of approximately 2 wt.-% ("(C-4)").

Emulsogen COL 050 is a commercial product carboxylic acid (B) comprising, as main component, a carboxylic acid represented by formula (III) wherein $R^4$ is oleyl; $R^5$, $R^6$, $R^7$ and $R^8$ are hydrogen; and p is 5.

Synthesis Example 2

Synthesis of Component Z1): Ethoxylated Coconut Oil (45 EO)

The coconut oil (1 molar equivalent) and the catalyst (C-1) (0.8% by weight, based on the total weight of the mixture of coconut oil and ethylene oxide), were placed into a glass autoclave, which was then flushed with nitrogen by alternatingly applying vacuum and introducing nitrogen (3 cycles). The mixture was dried under aspirator vacuum at 100° C. for 1 hour. The pressure in the autoclave was restored to ambient with nitrogen and heated to 175° C. At this temperature the autoclave was pressurized with nitrogen to a pressure of 0.8 bar above atmospheric pressure, after which pressure-controlled dosage of ethylene oxide (45 molar equivalents) took place up to a maximum pressure of 4.5 bar above atmospheric pressure.

The ethoxylation is carried out in a semi-batch process with automated dosage of ethylene oxide within a given temperature window and up to the specified maximum pressure. The pressure is adjusted according to the increased filling volume of the vessel. After introduction of the intended amount of ethylene oxide and closing the ethylene oxide inlet, the reaction was continued until the pressure became constant. The reactor content was cooled to 90° C. and aspirator vacuum was applied for 30 minutes in order to remove residual ethylene oxide. The temperature was reduced to 80° C. and the final product was transferred into storage vessels and analyzed. The typical batch scale was 400 g to 2000 g. The uptake of the intended amount of ethylene oxide is assured by gravimetry and by determination of the saponification value according to DIN EN ISO 3681.

Analytical data: saponification value=65.0 mg KOH/g; OH-value=4.4 mg KOH/g; content polyethyleneglycol diester represented by the general formula (XV)=3 wt.-%.

Example 1: Drying Capacity and Clean Dishwasher Interior

The drying capacity of the detergent composition for machine dishwashing F4 according to the invention was investigated. As a comparative example, the drying capacity of the comparative formulations F1, F2, F3 and F5 were tested.

| Testing conditions: | |
|---|---|
| Dishwashing machine: | Miele G 1222 SC GSL-2 |
| Testware dishes: | 6 appetizer spoons |
| | 10 appetizer forks |
| | 6 teaspoons |
| | 12 knives |
| | 6 forks |
| | 6 spoons |
| | 1 gravy ladle |
| | 1 serving spoon |
| | 1 serving fork |
| | 12 drinking glasses |
| | 10 porcelain cups |
| | 26 porcelain plates |
| | 3 SAN (poly-styrene-co-acrylonitrile) plates |
| | 3 PP (polypropylene) plates |
| | 3 PP bowls |
| | 3 PE bowls |
| Dishwashing program: | R50° C./R1/KI65° C. |
| Water hardness: | 21 +/− 1° dH |
| Water softening: | none |
| Detergent dosage: | 18 g |
| Contamination: | 50 g ballast soil |
| Rinse aid: | none |
| Cleaning cycles: | 6; 1-3 for preconditioning and 4-6 for performance evaluation |

All items were treated once with an alkaline and an acidic cleaner.

Evaluation:

Evaluation of the testware was started 30 minutes after the dishwashing cycle was completed. During this time, the dishwasher door was closed. For each test, dishwashing cycles 4 to 6 were evaluated. In a fixed order and with a set time limit, the number of adherent drops of residual water was counted for each testware item. Depending on the counted number of drops, the following rating of the drying capacity results for each testware item:

Rating:

| | |
|---|---|
| 0 | dry, no water drops |
| 1 | 1 water drop |
| 2 | 2 water drops |
| 3 | 3 water drops |
| 4 | 4 water drops |
| 5 | 5 water drops |
| 6 | 6 water drops |
| 7 | 7 water drops |
| 8 | more than 7 water drops. |

In this rating scheme, there is a score of 0 for best performance and a score of 8 for worst performance for each testware dish. In Table A the average scoring for all evaluated cycles on each material class is given.

The results are shown in Table A.

Furthermore, the fatty residues on the filter were determined to assess the cleanliness in the machine after operating the dishwasher. The average amount of fatty residues on the filter for 3 evaluated cycles is given in Table A.

Compositions:

The compositions of the formulations F1-F5 are shown in Table A.

Example 2: Rinse Aiding Performance of Detergent Compositions for Machine Dishwashing The rinse aiding performance of the formulation F4 according to the invention was investigated. As comparative examples, the rinse aiding performance of the comparative formulations F1, F2, F3 and F5 was tested.

| Testing conditions: | |
|---|---|
| Dishwashing machine: | Miele G 1222 SC GSL2 |
| Testware dishes: | 12 drinking glasses |
| (8 material groups) | 3 PP bowls |
| | 3 melamine plates |
| | 3 butter dishes |
| | 3 knives (stainless steel; lower quality) |
| | 3 knives (stainless steel; medium quality) |
| | 3 knives (stainless steel; higher quality) |
| | 3 porcelain plates (medium quality) |
| | 3 porcelain plates (lower quality) |
| Dishwashing program: | program "R50/3 min/KI65" |
| Water hardness: | 21 +/− 1° dH |
| Water softening: | none |
| Detergent dosage: | 18 g, added to the dosage chamber before starting the test |
| Contamination: | 100 g frozen dirt, added immediately after the opening of the dosage chamber |
| Rinse aid: | none |
| Cleaning cycles: | 6 |

All testware dishes were treated once with demineralized water, Neodisher A 8, citric acid and again demineralized water.

Evaluation:

Evaluation of the testware was started at least 60 minutes after opening the door of the dishwashing machine after completion of the dishwashing cycle. For each test, dishwashing cycles 4 to 6 were evaluated. The assessment was carried out according to the following rating:

Rinse Aid Effects Considered for the Visual Rating:

| | |
|---|---|
| Spotting | concentrated punctional residue |
| Contact spots | stains resultant from contact points between the testware dishes and parts of the dishwashing machine |
| Stripes | rinse aid stripes |
| Film formation | continuous film spread uniformly on the testware dishes |
| Structured film formation | dispersed torn film |
| Solid residues | solid powder or crystalline residues |
| Fatty residues | fatty drops or fatty film formation |
| Iridescence | shimmering, iridescence |
| Other | other effects |

Visual Rating Marks:

| | |
|---|---|
| 10 | Perfect |
| 9 | Perfect to barely visible |
| 8 | Barely visible |
| 7 | Barely visible to visible |
| 6 | Visible |
| 5 | Visible to disturbing |
| 4 | Disturbing |
| 3 | Disturbing to unacceptable |
| 2 | Unacceptable |
| 1 | Absolutely unacceptable |

The combination of the above listed eight rinse aid effects leads to a rating from 1 to 10 according to the above visual rating marks, wherein a rating of 1 represents the worst performance and a rating of 10 represents the best performance. For each of the above material groups (glass, plastics, porcelain, stainless steel) an average rating for the dishwashing cycles 4 to 6 was determined. The average of the visual assessment is then multiplied by 10 in order to calculate an average respective performance index for each material group (10: worst performance; 100: best performance).

Compositions:

The composition of the formulation F4 according to the invention and of F1-F3 and F5 are shown in Table A. The results are also shown in Table A.

TABLE A

Compositions, drying capacity, fatty residues and rinse aiding performance of formulations F1-F5

| Component | F1 wt.-%*) | F2 wt.-%*) | F3 wt.-%*) | F4 wt.-%*) | F5 wt.-%*) |
|---|---|---|---|---|---|
| trisodium citrate dihydrate | 30.0 | 30.0 | 30.0 | 30.0 | 30.0 |
| sodium carbonate | 35.0 | 35.0 | 35.0 | 35.0 | 35.0 |
| sodium silicate | 2.0 | 2.0 | 2.0 | 2.0 | 2.0 |
| MGDA-$Na_3$ | 0.4 | 0.4 | 0.4 | 0.4 | 0.4 |
| sodium hydrogen carbonate | 1.3 | 1.3 | 1.3 | 1.3 | 1.3 |
| polycarboxylate | 5.0 | 5.0 | 5.0 | 5.0 | 5.0 |
| sodium percarbonate | 14.0 | 14.0 | 14.0 | 14.0 | 14.0 |
| TAED | 2.0 | 2.0 | 2.0 | 2.0 | 2.0 |
| HEDP | 1.5 | 1.5 | 1.5 | 1.5 | 1.5 |
| protease | 0.4 | 0.4 | 0.4 | 0.4 | 0.4 |
| amylase | 0.3 | 0.3 | 0.3 | 0.3 | 0.3 |
| modified fatty alcohol ethoxylate iso-$C_{11}H_{23}$—O-$(EO)_{21}$-$CH_2$—CH(OH)-n-$C_{10}H_{21}$ | 4.0 | — | 6.0 | 4.0 | — |
| ethoxylated triglyceride oil coconut oil + 45 EO from Synthesis example 2 | — | 6.0 | — | 2.0 | — |
| sodium sulfate**) | 4.2 | 2.2 | 2.2 | 2.2 | 8.2 |
| Remaining droplets on glass | 2.0 | 2.7 | 1.8 | 1.7 | 3.2 |
| Remaining droplets on plastic | 2.7 | 5.4 | 1.7 | 2.0 | 6.8 |
| Remaining droplets on porcelain | 1.3 | 1.6 | 1.0 | 0.9 | 2.2 |
| Remaining droplets on stainless steel | 0.8 | 1.2 | 0.8 | 0.6 | 1.9 |
| Fatty residues on filter [g] | 1.55 | 0.86 | 1.93 | 1.32 | 0.28 |
| Performance index on glass | 51 | 55 | 52 | 49 | 43 |
| Performance index on plastics | 55 | 56 | 53 | 55 | 52 |
| Performance index on porcelain | 64 | 61 | 63 | 59 | 48 |
| Performance index on stainless steel | 53 | 61 | 46 | 48 | 52 |

*)The ingredients were added according to their active component content in wt.-%.

**)Sodium sulfate is added as a filler for a constant mass balance of the detergent composition, without a function and without influence on the performance of the detergent composition.

All formulations F1-F4 show very good rinse aiding performance and drying capacity compared to the formulation F5 (without surfactants).

By using a formulation with 6 wt.-% ethoxylated triglyceride oil (F2) good drying capacity results can be achieved with only small fatty residues built-up in the machine. Whereas, by using a formulation with 6 wt.-% modified fatty alcohol alkoxylate (F3) superior drying capacity results can be obtained, with a drawback of significant accumulation of fatty residues in the machine. By the combination of both ingredients (4 wt.-% modified fatty alcohol alkoxylate/2 wt.-% ethoxylated triglyceride oil; formulation according to the invention F4) the fatty residues can be reduced compared to the results with 4 wt.-% modified fatty alcohol alkoxylate (F1) and 6 wt.-% modified fatty alcohol alkoxylate (F3) and the overall drying capacity can be improved compared to F2 and is similar compared to F3.

The results demonstrate an advantageous effect of the combination of the two ingredients (modified fatty alcohol alkoxylate and ethoxylated triglyceride oil).

The invention claimed is:

1. A detergent composition for machine dishwashing comprising components Z1) and Z2):

Z1) from 0.1 to 15 wt.-%, based on the total weight of the detergent composition, of a component comprising one or more ethoxylated glycerol esters of the formula (I)

(I)

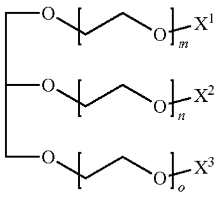

wherein $X^1$ is —C(═O)—$R^1$ or H, $X^2$ is —C(═O)—$R^2$ or H, $X^3$ is —C(═O)—$R^3$ or H, with the proviso that not all of the groups $X^1$, $X^2$ and $X^3$ are H;

$R^1$, $R^2$ and $R^3$ are equal or different and are independently selected from saturated or unsaturated, linear or branched $C_7$-$C_{24}$ aliphatic groups; and m, n and o are equal or different and are each independently an integer number from 1 to 200, with the proviso that the number-average of the sum of m+n+o is greater than 2, and Z2) from 0.1 to 15 wt.-%, based on the total weight of the detergent composition, of one or more modified fatty alcohol alkoxylates of the formula (XI)

$$R_aO—(AO)_x—Y, \quad (XI)$$

in which $R_a$ is a linear or branched saturated alkyl group having 8 to 30 carbon atoms, or a linear or branched unsaturated alkenyl group having one or more double bonds and 8 to 30 carbon atoms, A is selected from the group consisting of —$C_2H_4$— and —$C_3H_6$—, x is a number from 1 to 150, Y is a group —$CH_2$—CH(OH)—$R_b$ or is a linear or branched saturated alkyl group having 1 to 30 carbon atoms, where $R_b$ is a linear or branched saturated alkyl group having 1 to 30 carbon atoms, and where the group -$(AO)_x$— comprises one or more —$C_2H_4$—O— groups and may additionally comprise one or more —$C_3H_6$—O— groups, and, when the group -$(AO)_x$— simultaneously comprises —$C_2H_4$—O— and —$C_3H_6$—O— groups, the —$C_2H_4$—O— and —$C_3H_6$—O— groups may be distributed over the -$(AO)_x$— group in any desired way, and the molar amount of the —$C_2H_4$—O— groups in the group -$(AO)_x$— is greater than the molar amount of the —$C_3H_6$—O— groups in the group -$(AO)_x$—.

2. The detergent composition according to claim 1, wherein component Z1) further comprises one or more polyethyleneglycol diesters of the formula (XV)

(XV)

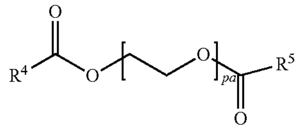

wherein $R^4$ and $R^5$ are equal or different and are independently selected from saturated or unsaturated, linear or branched $C_7$-$C_{24}$ aliphatic groups; and pa is an integer number from 1 to 200.

3. The detergent composition according to claim 1, wherein component Z1) is prepared from 1 to 200 mol ethylene oxide and 1 mol of one or more triglycerides of the formula (II)

(II)

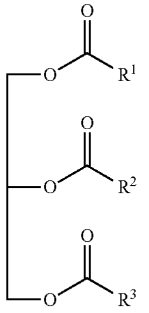

in the presence of a calcium-based catalyst, wherein $R^1$, $R^2$ and $R^3$ in formulae (II) are equal or different and are independently selected from saturated or unsaturated, linear or branched $C_7$-$C_{24}$ aliphatic groups.

4. The detergent composition according to claim 1, wherein component Z1) is prepared with a calcium-based catalyst (C) obtainable by a reaction involving (A) calcium hydroxide and (B) a carboxylic acid comprising 3 to 40 carbon atoms, wherein the molar ratio of calcium hydroxide (A) to carboxylic acid (B) in the preparation of the catalyst (C) is from 1:1 to 1:5.

5. The detergent composition according to claim 4, wherein the reaction for the preparation of the catalyst (C) involves a carboxylic acid (B) represented by formula (III) or formula (IV)

(III)

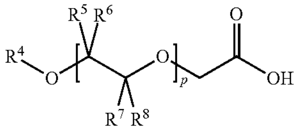

-continued (IV)

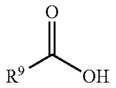

wherein $R^4$ in formula (III) is selected from saturated or unsaturated, linear or branched $C_1$-$C_{30}$ aliphatic groups;

$R^5$, $R^6$, $R^7$ and $R^8$ in formula (III) are equal or different and are independently selected from the group consisting of hydrogen, methyl, and ethyl;

p in formula (III) is an integer number from 0 to 20; and $R^9$ in formula (IV) is selected from saturated or unsaturated, linear, or branched $C_5$-$C_{30}$ aliphatic groups.

6. The detergent composition according to claim 4, wherein the reaction for the preparation of the catalyst (C) involving calcium hydroxide (A) and carboxylic acid (B) further involves an acid (AC) having a $pK_A$ value of 3 or less and the molar ratio of (A):(AC) is from 5:1 to 1:1.

7. The detergent composition according to claim 3, wherein the one or more triglycerides of the formula (II) are selected from the group consisting of coconut oil and rapeseed oil.

8. The detergent composition according to claim 1, wherein the one or more ethoxylated glycerol esters of the formula (I) are present in component Z1) in an amount of 60 wt.-% or more, based on the total weight of component Z1) of the detergent composition.

9. The detergent composition according to claim 1, wherein the hydroxyl value of component Z1) is smaller than 10 mg KOH/g.

10. The detergent composition according to claim 1, wherein in the one or more modified fatty alcohol alkoxylates of the formula (XI)

$$R_aO—(AO)_x—Y \qquad (XI)$$

of component Z2), $R_a$ is a linear or branched saturated alkyl group having 8 to 20 carbon atoms, or a linear or branched unsaturated alkenyl group having one or more double bonds and 8 to 20 carbon atoms, A is $—C_2H_4—$, x is a number from 5 to 100, and Y is a group $—CH_2—CH(OH)—R_b$, and $R_b$ is a linear or branched alkyl group having 8 to 22 carbon atoms.

11. The detergent composition according to claim 1, wherein the detergent composition it comprises from 0.5 wt.-% to 5.0 wt.-% of component Z1) and from 0.5 wt.-% to 6.0 wt.-% of component Z2), in each case based on the total weight of the detergent composition.

12. The detergent composition according to claim 1, wherein the detergent composition comprises component Z1) and component Z2) in a Z1):Z2) weight-ratio of from 1:1 to 1:3.

13. The detergent composition according to claim 1, wherein it the detergent composition comprises, further to the components Z1) and Z2), one or more components selected from:

Z3) one or more enzymes, selected from the group consisting of proteases, amylases, lipases, hemicellulases, cellulases, perhydrolases and oxidoreductases;

Z4) one or more builders;

Z5) one or more bleaching agents;

Z6) one or more surfactants different from components Z1) and Z2);

Z7) one or more polymers; and

Z8) one or more further additives, selected from the group consisting of chelating agents, glass corrosion inhibitors, water, organic solvents, thickeners, foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators.

14. A method of cleaning dishes in a dishwashing machine, wherein contaminated dishes are treated in the dishwashing machine with an aqueous alkaline composition comprising the detergent composition according to claim 1, and a pH value of the aqueous alkaline composition is from 8 to 13.

15. A method of improving the rinse aiding properties and/or the drying capacity of a machine dishwashing detergent composition, comprising the step of adding to the machine dishwashing detergent composition a mixture of components Z1) and Z2), as defined in claim 1.

* * * * *